US 12,453,360 B2

(12) United States Patent
Yamanaka

(10) Patent No.: US 12,453,360 B2
(45) Date of Patent: Oct. 28, 2025

(54) ACETIC ACID BACTERIA-CONTAINING COMPOSITION

(71) Applicant: Mizkan Holdings Co., Ltd., Aichi (JP)

(72) Inventor: Wakana Yamanaka, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 652 days.

(21) Appl. No.: 17/723,123

(22) Filed: Apr. 18, 2022

(65) Prior Publication Data

US 2022/0240549 A1 Aug. 4, 2022

Related U.S. Application Data

(63) Continuation-in-part of application No. PCT/JP2019/041173, filed on Oct. 18, 2019.

(51) Int. Cl.
*A23L 27/00* (2016.01)
*A23L 2/52* (2006.01)
*A23L 33/135* (2016.01)

(52) U.S. Cl.
CPC ............. *A23L 2/52* (2013.01); *A23L 33/135* (2016.08); *A23V 2002/00* (2013.01); *A23V 2200/16* (2013.01)

(58) Field of Classification Search
None
See application file for complete search history.

(56) References Cited

U.S. PATENT DOCUMENTS

| | | | |
|---|---|---|---|
| 11,388,915 | B2 | 7/2022 | Otsuji et al. |
| 2009/0209023 | A1 | 8/2009 | Ogawa et al. |
| 2019/0387778 | A1 | 12/2019 | Yoshimoto et al. |
| 2020/0268032 | A1 | 8/2020 | Okuyama |
| 2021/0037859 | A1 | 2/2021 | Otsuij et al. |

FOREIGN PATENT DOCUMENTS

| | | |
|---|---|---|
| JP | H02163068 A | 6/1990 |
| JP | 2007306882 A | 11/2007 |
| JP | 2008214215 A | 9/2008 |
| JP | 2016047041 A | 4/2016 |
| JP | 6533329 B1 | 6/2019 |
| KR | 20120051456 A | 5/2012 |
| WO | 2018159516 A1 | 9/2018 |
| WO | 2019043951 A1 | 3/2019 |
| WO | 2019151465 A1 | 8/2019 |

OTHER PUBLICATIONS

Supplementary European Search Report issued in corresponding European Application No. 19949405.5; dated Sep. 8, 2022 (5 pages).
M. Casale et al., "A Chemometrical Approach for Vinegar Classification by Headspace Mass Spectrometry of Volatile Compounds," Food Sci. Technol. Res. vol. 12, No. 3, pp. 223-230, Jun. 7, 2006 (3 pages).
"Bragg Organic Apple Cider Vinegar," Amazon.co.jp, https://www.amazon.co.jp/Bragg-organic apple cider vinegar_regular Japanese article_apple vinegar-946mldpB07G736ZRK, retrieved Mar. 12, 2021 (14 pages).
https://www.bragg.com/products/organic-apple-cider-vinegar; retrieved Mar. 12, 2021 (4 pages).
"Bragg Organic Apple Cider Vinegar," Yahoo! Japan Shopping, https://store.shopping.yahoo.co.jp/miya-naturalfoods/brasa001.html, retrieved Feb. 16, 2021 (2 pages).
"Coconut Secret Raw Coconut Vinegar," https://www.amazon.com/Coconut-Secret-Raw-Vinegar-Gluten-Free/dp/B003XB5LO8, retrieved Mar. 12, 2021 (12 pages).
"Coconut Vinegar-Coconut Secret," Coconut Secret, https://coconutsecret.com/pages/coconut-vinegar, retrieved Mar. 12, 2021 (3 pages).
"What is the shelf life of Coconut Vinegar?" Coconut Secret-Common Questions-Coconut Secret, Coconut Secret, https://coconutsecret.com/pages/coconut-faqs, retrieved Mar. 3, 2021 (1 page).
"Kokoro no su (pure rice vinegar)" Amazon, https://www.amazon.co.jp/%E2%BC%BE%E5%A1%9A%E9%86%B8%E9%80%A0%E5%BA%97-%E2%BC%BC%E3%81%AE%E9%85%A2-%E7%B4%94%E7%B2%8B%E2%BD%B6%E9%85%A2-500ml/dp/B003GXMWPE, retrieved Mar. 12, 2021 (9 pages).
"Kokoro no su (pure rice vinegar)," Amazon, https://www.amazon.co.jp/%E6%88%B8%E5%A1%9A%E9%86%B8%E9%80%A0%E5%BA%97-%E2%%E5%BF%83%E3%81%AE%E9%85%A2%E3%80%8E%E4%B8%8A%E6%BE%84%E3%81%BF%E7%84%A1%E6%BF%BE%E9%81%8E%E3%80%8F500ml-%E7%B4%94%E7%B1%B3-%E5%BF%83%E3%81%AE%E9%85%A2/dp/B017U059X0, retrieved Mar. 12, 2021 (6 pages).
"Ferment works Kombucha classic," Amazon, https://www.amazon.co.jp/ferment-works-KOMBUCHA-classic-%E5%9B%BD%E7%94%A3%E7%84%A1%E6%B7%BB%E5%8A%A0%E3%82%AF%E3%83%A9%E3%83%95%E3%83%88%E3%82%B3%E3%83%B3%E3%83%96%E3%83%81%E3%83%A3%EF%BC%8F%E7%B4%85%E8%80%B6%E3%82%AD%E3%83%8E%E3%82%B3%EF%BC%8F%E3%82%B9%E3%83%88%E3%83%AC%E3%83%BC%E3%83%88%E3%82%BF%E3%82%A4%E3%83%97/dp/B00YLUC29W, retrieved Mar. 12, 2021 (11 pages).
"Ferment works Kombucha classic," Amazon, https://www.fermentworks.jp/SHOP/KOM001.html, retrieved Mar. 12, 2021 (8 pages).
"Mother of Vinegar," https://sakura-paris.org/dict/%E6%97%A5%E5%A4%9635%E4%B8%87%E8%AA%9E%E7%A7%91%E5%AD%A6%E6%8A%80%E8%A1%93%E7%94%A8%E8%AA%9E%E5%A4%A7%E8%BE%9E%E5%85%B8/content/6149_1462, retrieved Mar. 15, 2021 (1 page).
https://kotobank.jp/word/%E9%85%A2%E6%AF%8D%E3%83%BB%E9%86%8B%E6%AF%8D-2042216, retrieved Mar. 15, 2021 (1 page).
Test report of Bragg Organic Apple Cider Vinegar, prepared by Bioengineering Lab. Co., Ltd., Feb. 10, 2021 (2 pages).

(Continued)

*Primary Examiner* — Jennifer E Graser
(74) *Attorney, Agent, or Firm* — Osha Bergman Watanabe & Burton LLP

(57) ABSTRACT

An acetic acid bacteria-containing composition comprising nonanal and methylheptenone, and having a peak area ratio of nonanal to methylheptenone (nonanal:methylheptenone), as determined by stir bar sorptive extraction thermal desorption gas chromatography-mass spectrometry (SBSE-GC/MS), of 1:10 to 100:1.

15 Claims, No Drawings

(56) References Cited

OTHER PUBLICATIONS

Test result report, prepared by Environmental Control Center Co.,Ltd., Mar. 11, 2021 (17 pages).
Test report of Kokoro no su, prepared by Bioengineering Lab. Co., Ltd., Feb. 10, 2021 (2 pages).
"Mother of Vinegar," Collins' English Dictionary, retrieved Feb. 14, 2022 (3 pages).
"Mother of Vinegar," Lexico Powered by Oxford, retrieved Feb. 14, 2022 (4 pages).
Notice of Reasons for Revocation issued in corresponding Japanese Application No. 2020-509563; dated Jul. 5, 2021 (27 pages).
Third Party Observation issued in International Application No. PCT/JP2019/041173; submitted on Feb. 17, 2022 (20 pages).
International Search Report issued in corresponding International Application No. PCT/JP2019/041173; mailed Dec. 24, 2019 (3 pages).
Written Opinion of the International Seaching Authority issued in corresponding International Application No. PCT/JP2019/041173; dated Dec. 24, 2019 (6 pages).

ACETIC ACID BACTERIA-CONTAINING COMPOSITION

CROSS-REFERENCE TO RELATED APPLICATION

This application claims priority to and the benefit of PCT Application PCT/JP2019/041173, filed Oct. 18, 2019, the contents of which are incorporated by reference in their entirety.

TECHNICAL FIELD

The present invention relates to an acetic acid bacteria-containing composition etc.

BACKGROUND ART

Microbial cells have various physiological actions and are thus widely used as an additive component for food products. For example, lactic acid bacteria, which have various physiological actions, such as an intestinal regulation action, an anti-allergic action, and a cholesterol-lowering action, are used as an additive component for beverages and other food products. However, when used in food products, microbial cells have a risk of adversely affecting the food quality. For example, Patent Literature (PTL) 1 reports that the addition of lactic acid bacteria to beverages causes the formation of precipitates and aggregates of the bacteria, which adversely affects the ease of intake and the appearance. Since acetic acid bacteria have metabolic characteristics, such as an ability to produce acetic acid and an ability to produce cellulose, they have been used in the production of various food products, such as vinegar, edible gels, and various fermented foods. Furthermore, due to their safety, acetic acid bacteria can be used not only for producing food products but also as an additive component for food products. For example, PTL 1 discloses a technique of suppressing deterioration of food product flavor during long-term storage by adding bacterial cells, such as acetic acid bacteria, to food products.

CITATION LIST

Patent Literature

PTL 1: JPH02-163068A

SUMMARY OF INVENTION

The present inventor focused on the bacterial odor when acetic acid bacteria are used as an additive component for food products. The bacterial odor of acetic acid bacteria adversely affects the flavors of food products and can hinder their use in food products. More specifically, acetic acid bacteria have an odor peculiar to bacterial cells (odor like sweaty feet and wet socks); therefore, when the bacteria themselves, or foods or beverages containing the bacteria, are consumed, the flavors of the foods or beverages themselves are impaired due to the strong unpleasant flavor of the bacteria.

In the process of conducting research, the present inventor found that the flavors and/or textures (e.g., sourness, bitterness, pungency, sweetness, and saltiness) of food products can be adjusted by adding acetic acid bacteria to the food products.

However, as mentioned above, there is also a concern about the bacterial odor of acetic acid bacteria, which adversely affects the flavor.

The present invention encompasses the following embodiments.

Item 1. An acetic acid bacteria-containing composition comprising nonanal and methylheptenone, and having a peak area ratio of nonanal to methylheptenone (nonanal:methylheptenone), as determined by stir bar sorptive extraction thermal desorption gas chromatography-mass spectrometry (SBSE-GC/MS), of 1:10 to 100:1.

Item 2. The acetic acid bacteria-containing composition according to Item 1, wherein the peak area ratio of nonanal to methylheptenone (nonanal:methylheptenone) is 1:1 to 50:1.

Item 3. The acetic acid bacteria-containing composition according to Item 1 or 2, further comprising dimethyl trisulfide.

Item 4. The acetic acid bacteria-containing composition according to Item 3, having a peak area ratio of nonanal to dimethyl trisulfide (nonanal:dimethyl trisulfide), as determined by SBSE-GC/MS, of 1:100 to 50:1.

Item 5. The acetic acid bacteria-containing composition according to Item 4, wherein the peak area ratio of nonanal to dimethyl trisulfide (nonanal:dimethyl trisulfide) is 1:100 to 10:1.

Item 6. The acetic acid bacteria-containing composition according to any one of Items 1 to 5, further comprising 2-tridecanone.

Item 7. The acetic acid bacteria-containing composition according to Item 6, having a peak area ratio of nonanal to 2-tridecanone (nonanal:2-tridecanone), as determined by SBSE-GC/MS, of 1:100 to 100:1.

Item 8. The acetic acid bacteria-containing composition according to Item 7, wherein the peak area ratio of nonanal to 2-tridecanone (nonanal:2-tridecanone) is 1:10 to 50:1.

Item 9. The acetic acid bacteria-containing composition according to any one of Items 1 to 8, further comprising dimethyl trisulfide and 2-tridecanone,
wherein
the peak area ratio of nonanal to methylheptenone (nonanal:methylheptenone) is 1:10 to 100:1,
the peak area ratio of nonanal to dimethyl trisulfide (nonanal:dimethyl trisulfide) is 1:100 to 50:1, and
the peak area ratio of nonanal to 2-tridecanone (nonanal:2-tridecanone) is 1:100 to 100:1.

Item 10. The acetic acid bacteria-containing composition according to any one of Items 1 to 9, for adjusting flavor and/or texture.

Item 11. The acetic acid bacteria-containing composition according to Item 10, for adjusting at least one member selected from the group consisting of sourness, bitterness, sweetness, saltiness, umami, pungency, astringency, richness, aroma, texture, soaked taste, and blur taste.

Item 12. A food additive containing the acetic acid bacteria-containing composition of any one of Items 1 to 11.

Item 13. A food product containing the acetic acid bacteria-containing composition of any one of Items 1 to 11.

Item 14. The food product according to Item 13, which is a seasoning, an edible oil, a fruit juice-containing beverage, a vegetable juice, a carbonated beverage, a soft drink, a grain beverage, a tea beverage, a milk beverage, a coffee beverage, a powdered beverage, a vinegar-containing beverage, an alcoholic beverage, a dessert, a baked confectionery, a steamed confectionery, a frozen dessert, a chocolate snack, chewing gum, a candy, a gummy, a cream, a jam, a fermented food product, a processed food product, a cooked food product, a retort food product, a cereal food product, a solid food product for vegetable consumption, a cooking oil, or a food product in a dosage form (health and nutrition (supplement) food product).

Item 15. A method for adjusting the flavor and/or texture of a food product, comprising adding the acetic acid bacteria-containing composition of any one of Items 1 to 11 to a food product.

Item 16. A method for producing a food product having an adjusted flavor and/or texture, the method comprising adding the acetic acid bacteria-containing composition of any one of Items 1 to 11 to a food product.

Item 17. A method for reducing the bacterial odor of acetic acid bacteria, the method comprising mixing acetic acid bacteria with nonanal and/or methylheptenone so that the peak area ratio of nonanal to methylheptenone (nonanal: methylheptenone), as determined by solid-phase microextraction gas chromatography-mass spectrometry, is 1:10 to 100:1.

Item 18. A method for producing an acetic acid bacteria-containing composition having a reduced bacterial odor of acetic acid bacteria, the method comprising mixing acetic acid bacteria with nonanal and/or methylheptenone so that the peak area ratio of nonanal to methylheptenone (nonanal: methylheptenone), as determined by solid-phase microextraction gas chromatography-mass spectrometry, is 1:10 to 100:1.

DESCRIPTION OF EMBODIMENTS

In the present specification, the expressions "contain," "comprise," and "include" encompass the concepts of containing, including, consisting essentially of, and consisting of.

In the present specification, the expression "and/or" encompasses the meanings of both "and" and "or."

For example, the expression "A and/or B" encompasses the meanings of both "A and B" and "A or B," and represents the three cases of A alone, B alone, and both A and B.

1. Acetic Acid Bacteria-Containing Composition

The present invention according to one embodiment relates to an acetic acid bacteria-containing composition comprising nonanal and methylheptenone, and having a peak area ratio of nonanal to methylheptenone (nonanal: methylheptenone), as determined by SBSE-GC/MS, of 1:10 to 100:1 (sometimes referred to herein as "the acetic acid bacteria-containing composition of the present invention"). This composition will be described below.

The acetic acid bacteria contained in the acetic acid bacteria-containing composition of the present invention are bacteria belonging to the family of Acetobacteraceae and are not particularly limited as long as they can produce acetic acid. Examples of acetic acid bacteria include bacteria belonging to the genus *Acetobacter*, bacteria belonging to the genus *Gluconobacter*, bacteria belonging to the genus *Gluconacetobacter*, bacteria belonging to the genus *Komagataeibacter*, bacteria belonging to the genus *Asaia*, bacteria belonging to the genus *Acidomonas*, bacteria belonging to the genus *Acidiphilium*, bacteria belonging to the genus *Acidisphaera*, bacteria belonging to the genus *Acidocella*, bacteria belonging to the genus *Acidomonas*, bacteria belonging to the genus *Asaia*, bacteria belonging to the genus *Belnapia*, bacteria belonging to the genus *Craurococcus*, bacteria belonging to the genus *Kozakia*, bacteria belonging to the genus *Leahibacter*, bacteria belonging to the genus *Muricoccus*, bacteria belonging to the genus *Neoasaia*, bacteria belonging to the genus *Oleomonas*, bacteria belonging to the genus *Paracraurococcus*, bacteria belonging to the genus *Rhodopila*, bacteria belonging to the genus *Roseococcus*, bacteria belonging to the genus *Rubritepida*, bacteria belonging to the genus *Saccharibacter*, bacteria belonging to the genus *Stella*, bacteria belonging to the genus *Swaminathania*, bacteria belonging to the genus *Teichococcus*, and bacteria belonging to the genus *Zavarzinia*.

Examples of acetic acid bacteria of the genus *Acetobacter* include *Acetobacter polyoxogenes, Acetobacter tropicalis, Acetobacter indonesiensis, Acetobacter syzygii, Acetobacter cibinongensis, Acetobacter orientalis, Acetobacter pasteurianus, Acetobacter orleanensis, Acetobacter lovaniensis, Acetobacter aceti, Acetobacter pomorum,* and *Acetobacter malorum.*

Examples of acetic acid bacteria of the genus *Gluconobacter* include *Gluconobacter frateurii* and *Gluconobacter cerinus.*

Examples of acetic acid bacteria of the genus *Gluconacetobacter* include *Gluconacetobacter swingsii, Gluconacetobacter xylinus, Gluconacetobacter diazotrophicus, Gluconacetobacter intermedius, Gluconacetobacter sacchari, Gluconacetobacter maltaceti, Gluconacetobacter kombuchae,* and *Gluconacetobacter liquefaciens.*

Examples of acetic acid bacteria of the genus *Komagataeibacter* include *Komagataeibacter hansenii, Komagataeibacter xylinus, Komagataeibacter europaeus,* and *Komagataeibacter oboediens.*

Examples of acetic acid bacteria of the genus *Asaia* include *Asaia bogorensis* and *Asaia siamensis.*

Examples of acetic acid bacteria of the genus *Acidomonas* include *Acidomonas methanolicus.*

Preferable examples of acetic acid bacteria include bacteria belonging to the genus *Acetobacter*, bacteria belonging to the genus *Gluconobacter*, bacteria belonging to the genus *Gluconacetobacter*, bacteria belonging to the genus *Asaia*, and bacteria belonging to the genus *Acidomonas*. From the standpoint of, for example, the bacterial odor and the effect of adjusting flavors and/or textures, acetic acid bacteria are more preferably, for example, bacteria belonging to the genus *Acetobacter*, bacteria belonging to the genus *Gluconacetobacter*, and bacteria belonging to the genus *Komagataeibacter*, and even more preferably *Acetobacter malorum, Komagataeibacter xylinus* NBRC 15237, and *Komagataeibacter europaeus* NBRC 3261, and particularly preferably *Acetobacter malorum.*

*Acetobacter malorum* is preferably, for example, *Acetobacter malorum* NCI1683 (FERM BP-10595). *Acetobacter malorum* NCI1683 (FERM BP-10595) is an acetic acid bacterium isolated from smetana, which is Russian fermented food. The ubiquinone type is Q9, and the sequence is completely matched with the 16SrRNA sequence. Accordingly, this bacterium has been identified as *Acetobacter malorum* (see, for example, International Journal of Systematic and Evolutionary Microbiology, vol. 52, pp. 1551-1558, 2002) and was deposited at the International Patent Organism Depositary of the National Institute of Advanced Industrial Science and Technology (Tsukuba Central 6, 1-1-1 Higashi, Tsukuba, Ibaraki, Japan) on Apr. 7, 2006, under the accession number FERM BP-10595.

The origin of acetic acid bacteria is not particularly limited, and the acetic acid bacteria for use may be, for example, acetic acid bacteria used for the production of vinegar, acetic acid bacteria isolated from vinegar manufacturing sites, natural environments, etc., and acetic acid bacteria from microorganism preservation facilities.

Any available acetic acid bacteria (e.g., acetic acid bacteria obtained from a vinegar manufacturing site) may be used as is for the acetic acid bacteria-containing composition of the present invention. Alternatively, those that have been subjected to a treatment such as culturing may also be used. The method of culturing acetic acid bacteria is not particularly limited, and may be, for example, a method according to or equivalent to a known method. For example, culturing may be performed, for example, at 25 to 35° C. by using various culture methods (e.g., a static culture method, a shaking culture method, or an aeration culture method with stirring) in a medium containing a carbon source (e.g., glucose and sucrose), a nitrogen source (e.g., peptone and fermented cell degradation products), an inorganic substance, etc. After culturing, the resulting product can be used as is for the acetic acid bacteria-containing composition of the present invention. Alternatively, after bacteria are harvested, a post-treatment (e.g., treatment of removing the culture medium (e.g., vinegar or culture liquid), washing treatment, drying treatment, or high-temperature treatment under low pH conditions) may be performed, if necessary, before being used for the acetic acid bacteria-containing composition of the present invention. The treatment of removing a culture medium may be performed by solid-liquid separation, such as centrifugation. The washing treatment may be performed, for example, by solid-liquid separation by adding water (preferably multiple times). The acetic acid bacteria may be live or dead bacteria.

The acetic acid bacteria may be used singly or in any combination of two or more.

The acetic acid bacteria-containing composition of the present invention comprises nonanal and methylheptenone. Nonanal (CAS registry number: 124-19-6) is a component of fragrance of flowers and fruits and is used as a raw material of perfumes. Methylheptenone (6-methyl-5-hepten-2-one (CAS registry number: 110-93-0)) is a component contained in essential oils of many plants, including lemongrass and chamomile. The acetic acid bacteria-containing composition of the present invention is characterized by comprising these two components such that the peak area ratio of these two components (nonanal:methylheptenone) as determined by SBSE-GC/MS is a specific value. The nonanal contained in the acetic acid bacteria-containing composition of the present invention may be the nonanal of acetic acid bacteria themselves, may originate from an ingredient of foods or drinks, may originate from a component of a perfume, or may be a single formulation. The nonanal may be any nonanal as long as it is suitable for foods and drinks.

The content of nonanal in the acetic acid bacteria-containing composition of the present invention is not particularly limited as long as the effects of the present invention are obtained. The content is preferably such that the peak area value of nonanal, as determined by SBSE-GC/MS is, for example, 50,000 to 10,000,000, preferably 200,000 to 5,000,000, more preferably 400,000 to 3,000,000, even more preferably 500,000 to 2,500,000, still more preferably 600,000 to 2,000,000, and particularly preferably 700,000 to 1,500,000.

The content (concentration) of nonanal in the acetic acid bacteria-containing composition is, for example, 1 to 10000 ppb, preferably 5 to 5000 ppb, more preferably 10 to 3000 ppb, even more preferably 30 to 2500 ppb, still more preferably 40 to 2000 ppb, and particularly preferably 50 to 1500 ppb.

The content (concentration) of nonanal can be calculated by analyzing aroma components with known concentrations as reference samples, creating a calibration curve based on the detected peak area, and applying the peak areas of the analysis results of the analyzed samples to the calibration curve.

The acetic acid bacteria-containing composition of the present invention comprises methylheptenone. The origin of methylheptenone contained in the acetic acid bacteria-containing composition is not particularly limited; methylheptenone may be the methylheptenone of acetic acid bacteria themselves, may originate from an ingredient of foods or drinks, may originate from a component of a perfume, or may be a single formulation. The methylheptenone may be any methylheptenone as long as it is suitable for foods and drinks, and as long as the peak area ratio of nonanal to methylheptenone is 1:10 to 100:1.

The acetic acid bacteria-containing composition of the present invention has a peak area ratio of nonanal to methylheptenone (nonanal:methylheptenone), as determined by SBSE-GC/MS, of 1:10 to 100:1, thereby reducing the bacterial odor of the acetic acid bacteria-containing composition of the present invention itself, and reducing the bacterial odor when added to compositions (e.g., food products) having flavor. The peak area ratio (nonanal:methylheptenone) is preferably 1:6 to 60:1, more preferably 1:1 to 50:1, even more preferably 1:1 to 20:1, still more preferably 2:1 to 10:1, furthermore preferably 3:1 to 7.6:1, and particularly preferably 3.1:1 to 7.6:1, from the standpoint of reducing bacterial odor.

The acetic acid bacteria-containing composition of the present invention preferably further comprises dimethyl trisulfide from the standpoint of reducing the bacterial odor. Dimethyl trisulfide (CAS No.: 3658-80-8) is a colorless to pale-yellow liquid with a fresh onion-like odor and is naturally found in hops, cabbage, broccoli, cauliflower, and the like. The acetic acid bacteria-containing composition of the present invention more preferably has a peak area ratio of nonanal to dimethyl trisulfide (nonanal:dimethyl trisulfide) of 1:100 to 50:1, as determined by SBSE-GC/MS, from the standpoint of reducing the bacterial odor. From the same standpoint, the peak area ratio (nonanal:dimethyl trisulfide) is still more preferably 1:100 to 15:1, still even more preferably 1:100 to 10:1, particularly more preferably 1:30 to 10:1, particularly even more preferably 1:25 to 10:1, and furthermore particularly preferably 1:20 to 5:1.

The acetic acid bacteria-containing composition of the present invention preferably further comprises 2-tridecanone from the standpoint of reducing the bacterial odor. 2-Tridecanone (CAS registry number: 593-08-8) is a component present in coconut oil, palm oil, various berries, and various cheeses. The acetic acid bacteria-containing composition of the present invention more preferably has a peak area ratio of nonanal to 2-tridecanone (nonanal:2-tridecanone) of 1:100 to 100:1, as determined by SBSE-GC/MS, from the standpoint of reducing the bacterial odor. From the same standpoint, the peak area ratio (nonanal:2-tridecanone) is still more preferably 1:50 to 50:1, still even more preferably 1:10 to 50:1, particularly more preferably 1:6 to 25:1, and furthermore particularly preferably 1.7:1 to 23:1.

From the standpoint of reducing the bacterial odor, the acetic acid bacteria-containing composition of the present invention preferably further comprises dimethyl trisulfide and 2-tridecanone (in addition to nonanal and methylheptenone), wherein the peak area ratio of nonanal to methylheptenone (nonanal:methylheptenone) is 1:1 to 50:1, the peak area ratio of nonanal to dimethyl trisulfide (nonanal: dimethyl trisulfide) is 1:100 to 50:1, and the peak area ratio of nonanal to 2-tridecanone (nonanal:2-tridecanone) is 1:100 to 100:1. Each of the peak area ratios in this embodiment may be within the preferable ranges stated above.

The peak area values and peak area ratios are determined by SBSE-GC/MS according to the method described in the Examples below.

The acetic acid bacteria-containing composition of the present invention is not particularly limited as long as the composition comprises acetic acid bacteria and satisfies the peak area ratio of nonanal to methylheptenone as described above. The acetic acid bacteria-containing composition of the present invention encompasses both a composition that also comprises additional components other than acetic acid bacteria, and a composition consisting of acetic acid bacteria. Examples of the components other than acetic acid bacteria include components that are externally added, such as the components mentioned above (nonanal, methylheptenone, dimethyl trisulfide, and 2-tridecanone), solvents (e.g., water and alcohol), and various ingredients that can be added to foods and drinks.

The properties and state of the acetic acid bacteria-containing composition of the present invention are not particularly limited. The acetic acid bacteria-containing composition of the present invention may be, for example, in the form of a solid (e.g., powder), a semisolid, or a liquid.

The content (on a dry mass basis) of acetic acid bacteria in the acetic acid bacteria-containing composition of the present invention is not particularly limited, and may be, for example, 50 to 100 mass %, 70 to 100 mass %, 80 to 100 mass %, 90 to 100 mass %, 95 to 100 mass %, 97 to 100 mass %, 98 to 100 mass %, 99 to 100 mass %, 99.5 to 100 mass %, or 99.9 to 100 mass %, per 100 mass % of the acetic acid bacteria-containing composition of the present invention (on a dry mass basis).

When the acetic acid bacteria-containing composition of the present invention comprises the externally added components mentioned above (nonanal, methylheptenone, dimethyl trisulfide, and 2-tridecanone), the total content (on a dry mass basis) of acetic acid bacteria and the added components in the acetic acid bacteria-containing composition of the present invention is not particularly limited, and is, for example, 50 to 100 mass %, 70 to 100 mass %, 80 to 100 mass %, 90 to 100 mass %, 95 to 100 mass %, 97 to 100 mass %, 98 to 100 mass %, 99 to 100 mass %, 99.5 to 100 mass %, or 99.9 to 100 mass %, per 100 mass % of the acetic acid bacteria-containing composition of the present invention (on a dry mass basis).

By using the effect of the above components (i.e., the effect of reducing acetic acid bacterial odor), the present invention according to one embodiment relates to a method for reducing the bacterial odor of acetic acid bacteria or a method for producing an acetic acid bacteria-containing composition having a reduced bacterial odor of acetic acid bacteria, each of these methods comprising mixing acetic acid bacteria with nonanal and/or methylheptenone such that the peak area ratio of nonanal to methylheptenone (nonanal: methylheptenone), as determined by SBSE-GC/MS, is 1:10 to 100:1.

2. Use

The acetic acid bacteria-containing composition of the present invention has a reduced bacterial odor of acetic acid bacteria and thus can be used for food additives, foods, and the like. From this standpoint, the present invention according to one embodiment relates to, for example, a food additive containing the acetic acid bacteria-containing composition of the present invention (sometimes referred to herein as "the food additive of the present invention) and a food product containing the acetic acid bacteria-containing composition of the present invention (sometimes referred to herein as "the food product of the present invention").

Further, the acetic acid bacteria-containing composition of the present invention has a reduced acetic acid bacteria odor and has an effect of adjusting the flavor and/or texture of food products; thus, the acetic acid bacteria-containing composition of the present invention can be used for adjusting flavors and/or textures. From this standpoint, the present invention according to one embodiment relates to, for example, a method for adjusting (or imparting an effect of adjusting) the flavor and/or texture of a food product, the method comprising adding the acetic acid bacteria-containing composition of the present invention to a food product, and relates to a method for producing a food product having flavor and/or texture that has been adjusted (or having an effect of adjusting flavor and/or texture), the method comprising adding the acetic acid bacteria-containing composition of the present invention to a food product. These embodiments are described below.

Examples of the target for adjustment include, but are not particularly limited to, sourness, bitterness, sweetness, saltiness, umami, pungency, astringency, richness, aroma, texture, soaked taste, and blur taste. Among these, sourness, bitterness, pungency, sweetness, saltiness, and the like are preferred. The use of the acetic acid bacteria-containing composition of the present invention can suppress sourness, bitterness, pungency, sweetness, and the like, and can enhance saltiness. From this standpoint, the acetic acid bacteria-containing composition of the present invention can be suitably used for, for example, suppressing sourness, suppressing bitterness, suppressing pungency, suppressing sweetness, and enhancing saltiness.

More specific examples of the effect of adjusting the flavors mentioned above and the effect of adjusting flavors other than those mentioned above include suppression of blur taste and grassy odor (e.g., vegetables, beans, and fruits), suppression of sea odor, suppression of acidic smell, enhancement of sweetness of rice, suppression of smell of rice deterioration, suppression of stuffy smell (e.g., black vinegar, apple vinegar), enhancement of fresh (or refreshing) aroma or fruit juice feeling of fruits and fruit juices (e.g., apples, citrus fruits, pineapples, grapes), suppression of vinegar stimulation to the throat, suppression of lingering sweetness aftertaste, suppression of stickiness in sweetness, enhancement of sweet aroma, enhancement of thick feeling (creaminess) (e.g., milk components, sesame, vegetable juices, soy milk), enhancement of roasting aroma (e.g., sesame, coffee), suppression of milky odor, suppression of cacao bitterness, suppression of oxidation smell of oils, enhancement of spice flavor, enhancement of honey flavor, suppression of chemical odor, suppression of meat odor, suppression of soy sauce spiciness, enhancement of dashi aroma, suppression of raw odor of dashi, suppression of sharp saltiness, suppression of retort smell (metallic odor), suppression of rice odor, suppression of unevenness in taste, suppression of smell of natto (fermented soybeans), suppression of (hot and humid) heating smell (associated with concentration reduction), suppression of harsh taste (e.g., vegetables), enhancement of richness (e.g., cocoa), enhancement of aroma of miso, enhancement of aroma of shiso, enhancement of tangled taste, enhancement of cool sensation, enhancement of savory aroma, enhancement of umami of rice, suppression of sharp sourness, suppression of burning smell of oils, suppression of raw fish odor, improvement of strong flavor after heating, enhancement of sweetness in vegetables, suppression of astringent taste of yogurt, enhancement of harmonized aroma, suppression of vitamin smell, enhancement of refreshing feeling of carbonic acid, enhancement of fresh (or refreshing) sweetness of fruits and fruit juices (e.g., apples, citrus fruits, pineapples, grapes), and suppression of collagen odor.

Examples of the effect of adjusting texture include, but are not particularly limited to, suppression of stickiness (e.g., rice), enhancement of crunchiness (e.g., crispiness of vegetables, crunchy (or crispy) texture of baked confectioneries), improvement of tenderness of meat, improvement of tenderness of confectionery dough, and enhancement of firmness of noodles.

The food additive of the present invention may consist only of the acetic acid bacteria-containing composition of the present invention, or may contain other components in addition to the composition. Food additives are used in the production of food products by, for example, adding to, mixing with, or infiltrating with foods. The other components are not particularly limited as long as they can be added to foods. Examples include carriers (e.g., excipients, binders, disintegrating agents, disintegrating aids, lubricants, and wetting agents) and additives that can be added to foods. The form of the food additive of the present invention is not particularly limited. Examples include granules, powders, tablets, pills, and capsules (including hard and soft capsules).

The type of food products targeted by the present invention is not particularly limited. Examples of food products include

- seasonings, such as sauces (e.g., yakiniku (grilled meat cuisine) sauces and sesame sauces and other sesame-containing seasonings), dressings, vinegar seasonings (e.g., general-purpose vinegar seasonings, vinegar seasonings for vinegared dishes, vinegar seasonings for sushi rice, seasoning liquids for pickling (e.g., for pickles), and sweet vinegars), cooked rice seasonings, soy sauce, miso, hishio (fermented foods before koji is squeezed in soy sauce production), ponzu seasonings, dashi-containing seasonings (e.g., mentsuyu (soup bases) and hot-pot soup bases), natto seasonings, pickling seasonings, meat seasonings, vinegars, warishita (sukiyaki sauce), mirin, Worcestershire sauces, ketchup, oyster sauces, salsa, sambal sauces, chili sauces, spicy-spice-containing seasonings, chutney, mustard, mayonnaise, curry powders, and furikake (a seasoning for sprinkling on top of rice);
- edible oils;
- fruit juice-containing beverages, such as fruit juices, flavored beverages, flavored water, beauty drinks, and smoothies of citrus fruits (e.g., mandarin, orange, lemon, lime, grapefruit, *Citrus junos, Citrus sphaerocarpa, Citrus sudachi*, and *Citrus hassaku*), tropical fruits (e.g., pineapple, banana, guava, mango, acerola, *papaya*, and passion fruit), lychee, strawberry, apple, peach, grape, Japanese plum, pear, apricot, Asian plum, kiwifruit, melon, blueberry, and acai;
- vegetable beverages, such as juices, smoothies, and aojiru (green juice) of tomato, carrot, and pumpkin;
- carbonated beverages, such as Coke, soda pop, and flavored beverages;
- soft drinks, such as sports drinks, flavored beverages (e.g., lemonade), and fruit-flavored drinks;
- grain beverages, such as grain beverages containing rice, soy milk, or almonds as a main ingredient;
- tea beverages, such as red tea, oolong tea, green tea, black tea, matcha tea, hojicha (Japanese green tea), and blended tea (e.g., pearl barley, barley, brown rice, soybeans, corn, and other grains, persimmon leaves, loquat leaves, leaves of kuma bamboo grass, *Gynostemma pentaphyllum, ashitaba (Angelica keiskei)*, and *dokudami (Houttuynia cordata)*, kelp, safflower, shiitake mushroom, and *Litchi chinensis*);
- milk beverages, such as milk and beverages containing milk or milk components (e.g., processed products of milk, such as skimmed milk powder, full-fat milk powder, milk concentrate, dairy cream, condensed milk, butter, skimmed milk, cream powder, sweetened milk powder, modified milk powder, whey powder, and buttermilk powder);
- coffee beverages;
- powdered beverages, such as cocoa and aojiru;
- vinegar-containing beverages, such as vinegar drinks; alcoholic beverages, such as beers, beer-taste beverages (e.g., low-malt beers), fruit wines, sake, and other brewed liquors, shochu, whiskey, brandy, spirits, and other distilled liquors, liqueurs, which are made by mixing a distilled liquor and sugar etc. as a secondary ingredient, and other mixed alcoholic beverages, cocktails, fizzes, and chuhai, which are made by further adding fruit juices, flavors, carbon dioxide, etc. to those alcoholic beverages;
- desserts, such as puddings (e.g., custard pudding, milk pudding, and fruit-juice-containing pudding), jellies (e.g., fruit-juice-containing jellies), bavarois, yogurt, soy milk yogurt, pancakes, and cakes;
- baked confectioneries, such as hard biscuits, cookies, cakes, pancakes, okaki (rice crackers made from mochi rice), and senbei (rice crackers made from uruchi rice);
- steamed confectioneries, such as manju (a steamed bun with sweet bean paste) and steamed yokan (a bar of gelled sweet bean paste); frozen desserts, such as fruit-juice-containing ice cream, soft-serve ice cream, and popsicles;
- chewing gum;
- chocolate snacks, such as high-cacao chocolate, milk chocolate, marble chocolate, strawberry chocolate, blueberry chocolate, and melon chocolate;
- candies, such as bonbon candies, butter balls, marble candies, caramel candies, nougats, gummy candies, marshmallows, fruit-juice-containing candies, and tablet candies;
- gummies, such as fruit-juice-containing gummies;
- cereal food products;
- creams;
- jams, such as jams of strawberry, apricot, apple, orange, grape, fig, blueberry, raspberry, blackberry, and peach;
- fermented food products, such as natto, kimchi, and yogurt; processed food products, such as pickles (e.g., pickled Japanese plums), fish meat ham, fish meat sausage, fish meat surimi, kamaboko (fishcake), chikuwa (tube-shaped fishcake), hanpen (fish paste), satsuma-age (fried fishcake), datemaki (rolled omelet), bacon, ham, sausage, and roasted pork;
- cooked food products, such as miso soup, soup, vinegared dishes, shumai (a type of traditional Chinese dumpling), gyoza (Japanese pan-fried dumplings), Salisbury steak, pilaf, gratin, curry, stew, oden (a type of one-pot dish), simmered dishes, fried dishes, rice bowl dishes (e.g., beef bowl), noodles (e.g., pasta, udon (thick noodles made from wheat flour), and ramen), pancakes, and cakes;
- retort food products;
- solid food products for vegetable consumption, such as vegetable bars and vegetable pastes;

cooking oils;
food products in dosage forms (e.g., granules, powders, tablets, pills, and capsules), such as health and nutrition (supplement) food products.

The food products also include those cooked to be eaten at home (e.g., pancake mixes, mixed flour for preparing noodles, and various food ingredients or combinations thereof).

The content of the acetic acid bacteria-containing composition of the present invention (on a dry basis) in the food product of the present invention is, for example, 0.001 to 10 mass % per 100 mass % of the food product of the present invention. The content is, for example, 0.003 to 7 mass %, and preferably 0.01 to 5 mass %, from the standpoint of the bacterial odor and the effect of adjusting the flavors and/or textures.

When the acetic acid bacteria-containing composition of the present invention is added to a food product, the amount of the composition is preferably as stated above. There are no particular restrictions on when to add the acetic acid bacteria-containing composition of the present invention to food products. It may be, for example, during the production of the food product, after the production of the food product, before eating the food product, or during eating the food product. After added to a food product, the acetic acid bacteria-containing composition of the present invention is preferably mixed, if necessary, so that the components of the composition are dispersed as evenly as possible in the food product.

In one embodiment of the present invention, the acetic acid bacteria-containing composition of the present invention is preferably used for the following food products.

2-1. Vinegar Seasoning

The present invention according to one embodiment relates to vinegar seasonings (e.g., general-purpose vinegar seasonings, vinegar seasonings for vinegared dishes, vinegar seasonings for sushi rice, seasoning liquids for pickling (e.g., for pickles), and sweet vinegars) containing the acetic acid bacteria-containing composition of the present invention, food products (e.g., vinegared dishes, sushi rice, pickled foods, and sweet-and-sour pork) containing the vinegar seasonings, and food additives for use in their preparation.

The acetic acid bacteria-containing composition of the present invention is capable of exhibiting the effect of adjusting, preferably, the following flavors and/or textures of vinegar seasonings or food products containing vinegar seasonings: suppression of sourness, suppression of acidic smell, suppression of grassy odor (e.g., vegetables), suppression of sea odor (e.g., seaweed), enhancement of saltiness, suppression of stickiness (e.g., rice), enhancement of sweetness of rice, suppression of smell of rice deterioration, enhancement of crunchiness (e.g., crispiness of vegetables), enhancement of soaked taste, enhancement of spice flavor, enhancement of tangled taste, and the like. Therefore, the acetic acid bacteria-containing composition of the present invention can be used for adjusting these flavors and/or textures. From this standpoint, the present invention according to one embodiment relates to, for example, a method for adjusting (or imparting an effect of adjusting) the above flavors and/or textures of vinegar seasonings or vinegar seasoning-containing food products, and further relates to a method for producing vinegar seasonings or vinegar seasoning-containing food products having the flavors and/or textures that have been adjusted (or having an effect of adjusting the flavors and/or textures), each of these methods comprising adding the acetic acid bacteria-containing composition of the present invention to the vinegar seasonings or vinegar seasoning-containing food products.

Vinegar seasonings are not particularly limited as long as they contain vinegar and optionally other seasonings, flavors, etc. Examples of vinegar include, but are not particularly limited to, grain vinegars, such as rice vinegar, rice black vinegar, and barley black vinegar; fruit vinegars, such as apple vinegar and grape vinegar; and synthetic vinegars. The components other than vinegar are not particularly limited as long as they can be used for vinegar seasonings. Examples include soy sauce, salt, sugar and other sweeteners, spices (e.g., bay leaves, black pepper), potato starch, and sesame oil.

The content of the acetic acid bacteria-containing composition of the present invention (on a dry basis) in a vinegar seasoning is preferably 0.01 to 1 or 2 mass % per 100 mass % of the vinegar seasoning. For a vinegar seasoning for vinegared dishes, the content is more preferably 0.05 to 1 mass %, even more preferably 0.1 to 0.5 mass %, and particularly preferably 0.1 to 0.2 mass %. For a vinegar seasoning for sushi rice, the content is more preferably 0.1 to 1 mass %, even more preferably 0.4 to 1 mass %, and particularly preferably 0.4 to 0.6 mass %. For a seasoning liquid for pickling (e.g., for pickles), the content is more preferably 0.05 to 1 mass %, even more preferably 0.1 to 0.5 mass %, and particularly preferably 0.1 to 0.2 mass %. For a sweet vinegar (e.g., sweet-and-sour pork), the content is more preferably 0.05 to 1 mass %, even more preferably 0.1 to 0.5 mass %, and particularly preferably 0.1 to 0.2 mass %.

2-2. Sesame-Containing Seasoning

The present invention according to one embodiment relates to sesame-containing seasonings (e.g., sesame sauces) containing the acetic acid bacteria-containing composition of the present invention, food products (e.g., cold shabu-shabu) containing the sesame-containing seasonings, and food additives for use in their preparation.

The acetic acid bacteria-containing composition of the present invention is capable of exhibiting the effect of adjusting, preferably, the following flavors of sesame-containing seasonings or food products containing sesame-containing seasonings: enhancement of thick feeling of sesame, enhancement of sesame roasting aroma, suppression of sourness, suppression of acidic smell, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of sesame-containing seasonings or food products containing sesame-containing seasonings, and further relates to a method for producing sesame-containing seasonings or food products containing sesame-containing seasonings, both having the flavors that have been adjusted (or having an effect of adjusting the flavors), each of these methods comprising adding the acetic acid bacteria-containing composition of the present invention to the sesame-containing seasonings or food products containing sesame-containing seasonings.

Sesame-containing seasonings are not particularly limited as long as they contain sesame and optionally other seasonings, flavors, etc. Sesame is not particularly limited and includes those with the seed shape partially or completely broken (e.g., ground sesame and sesame paste), in addition to those with an intact seed shape. The components other than sesame are not particularly limited as long as they can be used for sesame-containing seasonings. Examples include soy sauce, vinegar, sake, sugar and other sweeteners, and mustard.

The content of the acetic acid bacteria-containing composition of the present invention (on a dry basis) in a sesame-containing seasoning is preferably 0.01 to 1 mass % per 100 mass % of the sesame-containing seasoning. The content is more preferably 0.01 to 0.5 mass %, even more preferably 0.04 to 0.1 mass %, and particularly preferably 0.04 to 0.06 mass %.

2-3. Seasoning for Cooked Rice

The present invention according to one embodiment relates to cooked-rice seasonings (e.g., seasonings for rice balls) containing the acetic acid bacteria-containing composition of the present invention, food products (e.g., rice balls) containing the cooked-rice seasonings, and food additives for use in their preparation.

The acetic acid bacteria-containing composition of the present invention is capable of exhibiting the effect of adjusting, preferably, the following flavors and/or textures of cooked-rice seasonings or food products containing cooked-rice seasonings: enhancement of saltiness, suppression of stickiness of rice, suppression of rice odor, suppression of unevenness in taste, and the like. Therefore, the acetic acid bacteria-containing composition of the present invention can be used for adjusting these flavors and/or textures. From this standpoint, the present invention according to one embodiment relates to, for example, a method for adjusting (or imparting an effect of adjusting) the above flavors and/or textures of cooked-rice seasonings or food products containing cooked-rice seasonings, and further relates to a method for producing cooked-rice seasonings or food products containing cooked-rice seasonings, both having the flavors and/or textures that have been adjusted (or having an effect of adjusting the flavors and/or textures), each of these methods comprising adding the acetic acid bacteria-containing composition of the present invention to the cooked-rice seasonings or food products containing the cooked-rice seasonings.

Cooked-rice seasonings are not particularly limited as long as they contain components that can be used for seasoning rice. Examples include salt, soy sauce, mirin, sesame, dried bonito flakes, baby sardines, komatsuna, and sesame oil. Cooked-rice seasonings may be obtained after heating (e.g., stir frying) or the like to remove excess water, if necessary.

The content of the acetic acid bacteria-containing composition of the present invention (on a dry basis) in a cooked-rice seasoning is preferably 0.01 to 1 mass % per 100 mass % of the cooked-rice seasoning. The content is more preferably 0.01 to 0.5 mass %, even more preferably 0.04 to 0.1 mass %, and particularly preferably 0.04 to 0.06 mass %.

2-4. Miso

The present invention according to one embodiment relates to miso containing the acetic acid bacteria-containing composition of the present invention, food products (e.g., miso soups and instant miso soups) containing the miso, and food additives for use in their preparation.

The acetic acid bacteria-containing composition of the present invention is capable of exhibiting the effect of adjusting, preferably, the following flavors of miso or food products containing miso: enhancement of saltiness, suppression of harsh taste, enhancement of aroma of miso, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of miso or miso-containing food products, and further relates to a method for producing miso or miso-containing food products having the flavors that have been adjusted (or having an effect of adjusting the flavors), each of these methods comprising adding the acetic acid bacteria-containing composition of the present invention to miso or miso-containing food products.

The content of the acetic acid bacteria-containing composition of the present invention (on a dry basis) in miso is preferably 0.01 to 1 mass % per 100 mass % of the miso. The content is more preferably 0.01 to 0.5 mass %, even more preferably 0.04 to 0.1 mass %, and particularly preferably 0.04 to 0.06 mass %.

2-5. Ponzu Seasoning

The present invention according to one embodiment relates to ponzu seasonings (e.g., ponzu) containing the acetic acid bacteria-containing composition of the present invention, food products containing the ponzu seasonings (e.g., mizutaki and nabemono (Japanese hot-pot dishes)), and food additives for use in their preparation.

The acetic acid bacteria-containing composition of the present invention is capable of exhibiting the effect of adjusting, preferably, the following flavors of ponzu seasonings or food products containing ponzu seasonings: blur taste, enhancement of fresh aroma of citrus fruits, suppression of chemical odor, suppression of meat odor, suppression of soy sauce spiciness, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of ponzu seasonings or food products containing ponzu seasonings, and further relates to a method for producing ponzu seasonings or ponzu seasoning-containing food products having the flavors that have been adjusted (or having an effect of adjusting the flavors), each of these methods comprising adding the acetic acid bacteria-containing composition of the present invention to ponzu seasonings or food products containing ponzu seasonings.

Ponzu seasonings are not particularly limited as long as they contain the juice of citrus fruits (e.g., lemon, lime, *Citrus aurantium*, *Citrus junos*, *Citrus sudachi*, and *Citrus sphaerocarpa*) and optionally other seasonings, flavors, etc. The components other than the juice of citrus fruits are not particularly limited as long as they can be used for ponzu seasonings. Examples include vinegar, soy sauce, and mirin.

The content of the acetic acid bacteria-containing composition of the present invention (on a dry basis) in a ponzu seasoning is preferably 0.01 to 1 mass % per 100 mass % of the ponzu seasoning. The content is more preferably 0.01 to 0.5 mass %, even more preferably 0.05 to 0.2 mass %, and particularly preferably 0.08 to 0.15 mass %.

2-6. Dashi-Containing Seasoning

The present invention according to one embodiment relates to dashi-containing seasonings (e.g., mentsuyu) containing the acetic acid bacteria-containing composition of the present invention, food products (e.g., udon and somen (Japanese thin wheat noodles)) containing the dashi-containing seasonings, and food additives for use in their preparation.

The acetic acid bacteria-containing composition of the present invention is capable of exhibiting the effect of adjusting, preferably, the following flavors of dashi-containing seasonings or food products containing dashi-containing seasonings: enhancement of dashi aroma, suppression of raw odor of dashi, suppression of sharp saltiness, enhancement of umami, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of dashi-containing seasonings or food products containing dashi-containing seasonings, and further relates to a method for producing dashi-containing seasonings or food products containing dashi-containing seasonings, both having the flavors that have been adjusted (or having an effect of adjusting the flavors), each of these methods comprising adding the acetic acid bacteria-containing composition of the present invention to dashi-containing seasonings or food products containing dashi-containing seasonings.

Dashi-containing seasonings are not particularly limited as long as they contain dashi and optionally other seasonings, flavors, etc. Dashi is not particularly limited. Examples include dashi of kelp, dried bonito flakes, and the like. The components other than dashi are not particularly limited as long as they can be used for dashi-containing seasonings. Examples include soy sauce, sugar and other sweeteners, and salt.

The content of the acetic acid bacteria-containing composition of the present invention (on a dry basis) in a dashi-containing seasoning is preferably 0.01 to 1 mass % per 100 mass % of the dashi-containing seasoning. The content is more preferably 0.05 to 1 mass %, even more preferably 0.1 to 0.5 mass %, and particularly preferably 0.1 to 0.2 mass %.

2-7. Seasoning for Natto

The present invention according to one embodiment relates to natto seasonings (e.g., natto tare sauces) containing the acetic acid bacteria-containing composition of the present invention, natto containing the acetic acid bacteria-containing composition of the present invention, and food additives for use in their preparation.

The acetic acid bacteria-containing composition of the present invention is capable of exhibiting the effect of adjusting, preferably, the following flavors of natto: suppression of bitterness, suppression of the smell of natto, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of natto seasonings or natto, and further relates to a method for producing natto seasonings or natto having the flavors that have been adjusted (or having an effect of adjusting the flavors), each of these methods comprising adding the acetic acid bacteria-containing composition of the present invention to natto seasonings or natto.

Natto seasonings are not particularly limited as long as they contain components that can be used for seasoning natto. Examples include salt, soy sauce, sake, mirin, sugar and other sweeteners, vinegar, and mustard.

The content of the acetic acid bacteria-containing composition of the present invention (on a dry basis) in natto is preferably 0.01 to 1 mass % per 100 mass % of the natto. The content is more preferably 0.1 to 1 mass %, even more preferably 0.4 to 1 mass %, and particularly preferably 0.4 to 0.6 mass %.

2-8. Pickling Seasoning

The present invention according to one embodiment relates to pickling seasonings (e.g., seasonings for pickling Japanese plums) containing the acetic acid bacteria-containing composition of the present invention, pickles (e.g., pickled Japanese plums) containing the acetic acid bacteria-containing composition of the present invention, and food additives for use in their preparation.

The acetic acid bacteria-containing composition of the present invention is capable of exhibiting the effect of adjusting, preferably, the following flavors of pickles: suppression of sharp saltiness, suppression of sourness, enhancement of aroma of shiso, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of pickling seasonings or pickles, and further relates to a method for producing pickling seasonings or pickles having the flavors that have been adjusted (or having an effect of adjusting the flavors), each of these methods comprising adding the acetic acid bacteria-containing composition of the present invention to pickling seasonings or pickles.

Pickling seasonings are not particularly limited as long as they are used for seasoning pickles.

The content of the acetic acid bacteria-containing composition of the present invention (on a dry basis) in pickles is preferably 0.05 to 5 mass % per 100 mass % of the pickles. The content is more preferably 0.1 to 5 mass %, even more preferably 0.5 to 2 mass %, and particularly preferably 0.5 to 0.7 mass %.

2-9. Seasoning for Meat

The present invention according to one embodiment relates to meat seasonings containing the acetic acid bacteria-containing composition of the present invention, meat containing the acetic acid bacteria-containing composition of the present invention, and food additives for use in their preparation. Meat seasonings are used by adding to meat. The addition is preferably before heating (e.g., steaming, baking, and frying, preferably steaming) the meat.

The acetic acid bacteria-containing composition of the present invention is capable of exhibiting the effect of adjusting, preferably, the following flavors and/or textures of meat: suppression of meat odor, improvement of meat tenderness, and the like. Therefore, the acetic acid bacteria-containing composition of the present invention can be used for adjusting these flavors and/or textures. From this standpoint, the present invention according to one embodiment relates to, for example, a method for adjusting (or imparting an effect of adjusting) the above flavors and/or textures of meat seasonings or meat, and further relates to a method for producing meat seasonings or meat having the flavors and/or textures that have been adjusted (or having an effect of adjusting the flavors and/or textures), each of these methods comprising adding the acetic acid bacteria-containing composition of the present invention to meat seasonings or meat.

Meat seasonings are not particularly limited as long as they can be used for seasoning meat.

The content of the acetic acid bacteria-containing composition of the present invention (on a dry basis) in meat is preferably 0.01 to 1 mass % per 100 mass % of the meat. The content is more preferably 0.05 to 1 mass %, even more preferably 0.1 to 0.5 mass %, and particularly preferably 0.1 to 0.2 mass %.

2-10. Spicy-Spice-Containing Seasoning

The present invention according to one embodiment relates to spicy-spice-containing seasonings (e.g., seasonings for mapo dishes (tofu, eggplant, cellophane noodles, etc.), seasoning liquids for kimchi, and seasonings for kimchi dishes) containing the acetic acid bacteria-containing composition of the present invention, food products (e.g., mapo dishes (tofu, eggplant, cellophane noodles, etc.), kimchi, and kimchi dishes) containing the spicy-spice-containing seasonings, and food additives for use in their preparation.

The acetic acid bacteria-containing composition of the present invention is capable of exhibiting the effect of adjusting, preferably, the following flavors of spicy-spice-containing seasonings or food products containing spicy-spice-containing seasonings: suppression of pungency, enhancement of umami, enhancement of spice flavor, suppression of sharp sourness, and the like. Therefore, the acetic acid bacteria-containing composition of the present invention can be used for adjusting these flavors. From this standpoint, the present invention according to one embodiment relates to, for example, a method for adjusting (or imparting an effect of adjusting) the above flavors of spicy-spice-containing seasonings or food products containing spicy-spice-containing seasonings, and further relates to a method for producing spicy-spice-containing seasonings or food products containing spicy-spice-containing seasonings, both having the flavors that have been adjusted (or having an effect of adjusting the flavors), each of these methods comprising adding the acetic acid bacteria-containing composition of the present invention to spicy-spice-containing seasonings or food products containing spicy-spice-containing seasonings.

Spicy-spice-containing seasonings are not particularly limited as long as they contain spicy spices and optionally other seasonings, flavors, etc. Examples of spicy spices include, but are not particularly limited to, chili peppers. The components other than spicy spices are not particularly limited as long as they can be used for spicy-spice-containing seasonings. Examples include salt, soy sauce, miso, pepper, and sake.

The content of the acetic acid bacteria-containing composition of the present invention (on a dry basis) in a spicy-spice-containing seasoning is preferably 0.01 to 1 mass % per 100 mass % of the spicy-spice-containing seasoning. The content is more preferably 0.05 to 1 mass %, even more preferably 0.1 to 0.5 mass %, and particularly preferably 0.1 to 0.2 mass %.

2-11. Fruit Juice-Containing Beverage

The present invention according to one embodiment relates to fruit juice-containing beverages (e.g., flavored beverages, fruit juices, flavored water, and beauty drinks) or concentrates thereof and smoothies, each containing the acetic acid bacteria-containing composition of the present invention, and food additives for use in their preparation.

The acetic acid bacteria-containing composition of the present invention is capable of exhibiting the effect of adjusting, preferably, the following flavors of fruit juice-containing beverages: enhancement of fruit juice feeling, enhancement of honey flavor, suppression of sourness, suppression of bitterness, enhancement of fresh aroma of fruit juices, suppression of (hot and humid) heating smell (associated with concentration reduction), suppression of vitamin smell (when vitamins are contained), enhancement of refreshing feeling of carbonic acid (when carbonic acid is contained), enhancement of refreshing sweetness of fruits and fruit juices, suppression of collagen odor (when collagen is contained), and the like. Therefore, the acetic acid bacteria-containing composition of the present invention can be used for adjusting these flavors. From this standpoint, the present invention according to one embodiment relates to, for example, a method for adjusting the above flavors of fruit juice-containing beverages or concentrates thereof, and further relates to a method for producing fruit juice-containing beverages or concentrates thereof having the flavors that have been adjusted, each of these methods comprising adding the acetic acid bacteria-containing composition of the present invention to fruit juice-containing beverages or concentrates thereof.

Fruit juice-containing beverages are not particularly limited as long as they contain fruit juices and optionally other components. Fruit juices are not particularly limited and may be, for example, juices of apples, citrus fruits, pineapples, and grapes. Carbonated water may also be used in place of water. The components other than fruit juices are not particularly limited as long as they can be used for fruit juice-containing beverages. Examples include sugar and other sweeteners, honey, vitamin C and other vitamins, collagen, and hyaluronic acid.

The content of the acetic acid bacteria-containing composition of the present invention (on a dry basis) in a fruit juice-containing beverage is preferably 0.01 to 2 mass % per 100 mass % of the fruit juice-containing beverage. For flavored beverages, the content is more preferably 0.01 to 1 mass %, even more preferably 0.01 to 0.5 mass %, still more preferably 0.04 to 0.1 mass %, and particularly preferably 0.04 to 0.06 mass %. For fruit juices, the content is more preferably 0.05 to 1 mass %, even more preferably 0.1 to 0.5 mass %, and particularly preferably 0.1 to 0.2 mass %. For flavored water and beauty drinks, the content is more preferably 0.01 to 1 mass %, even more preferably 0.05 to 0.5 mass %, and particularly preferably 0.08 to 0.2 mass %.

2-12. Vegetable Juice

The present invention according to one embodiment relates to vegetable juices (e.g., tomato juice and carrot juice) or concentrates thereof and smoothies, each containing the acetic acid bacteria-containing composition of the present invention, and food additives for use in their preparation.

The acetic acid bacteria-containing composition of the present invention is capable of exhibiting the effect of adjusting, preferably, the following flavors of vegetable juices: suppression of grassy odor, suppression of sourness, enhancement of thick feeling, and the like. Therefore, the acetic acid bacteria-containing composition of the present invention can be used for adjusting these flavors. From this standpoint, the present invention according to one embodiment relates to, for example, a method for adjusting the above flavors of vegetable juices or concentrates thereof, and further relates to a method for producing vegetable juices or concentrates thereof having the flavors that have been adjusted, each of these methods comprising adding the acetic acid bacteria-containing composition of the present invention to vegetable juices or concentrates thereof.

Vegetable juices are not particularly limited as long as they contain vegetable juices and optionally other components. The components other than vegetable juices are not particularly limited as long as they can be used for vegetable juices. Examples include sugar and other sweeteners, and salt.

The content of the acetic acid bacteria-containing composition of the present invention (on a dry basis) in a vegetable juice is preferably 0.01 to 1 mass % per 100 mass % of the vegetable juice. The content is more preferably 0.05 to 1 mass %, even more preferably 0.1 to 0.5 mass %, and particularly preferably 0.1 to 0.2 mass %.

2-13. Milk Beverage

The present invention according to one embodiment relates to milk beverages (e.g., milk) or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of milk beverages: suppression of milky odor, enhancement of creaminess, and the like. Therefore, the acetic acid bacteria-containing composition of the present invention can be used for adjusting these flavors. From this standpoint, the present invention according to one embodiment relates to, for example, a method for adjusting the above flavors of milk beverages or concentrates thereof, and further relates to a method for producing milk beverages or concentrates thereof having the flavors that have been adjusted, each of these methods comprising adding the acetic acid bacteria-containing composition of the present invention to milk beverages or concentrates thereof.

Milk beverages are not particularly limited as long as they contain milk components and optionally other components. Examples of milk components include, but are not particularly limited to, milk itself, concentrates of milk, and concentrates of processed products of milk. The components other than milk components are not particularly limited as long as they can be used for milk beverages. Examples include sugar and other sweeteners.

The content of the acetic acid bacteria-containing composition of the present invention (on a dry basis) in a milk beverage is preferably 0.01 to 1 mass % per 100 mass % of the milk beverage. The content is more preferably 0.01 to 0.5 mass %, even more preferably 0.04 to 0.1 mass %, and particularly preferably 0.04 to 0.06 mass %.

2-14. Soy Milk Beverage

The present invention according to one embodiment relates to soy milk beverages or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of soy milk beverages: suppression of grassy odor, enhancement of thick feeling, and the like. Therefore, the acetic acid bacteria-containing composition of the present invention can be used for adjusting these flavors. From this standpoint, the present invention according to one embodiment relates to, for example, a method for adjusting the above flavors of soy milk beverages or concentrates thereof, and further relates to a method for producing soy milk beverages or concentrates thereof having the flavors that have been adjusted, each of these methods comprising adding the acetic acid bacteria-containing composition of the present invention to soy milk beverages or concentrates thereof.

Soy milk beverages are not particularly limited as long as they contain soy milk components and optionally other components. Examples of soy milk components include, but are not particularly limited to, soy milk itself, concentrates of soy milk, and concentrates of processed products of soy milk. The components other than soy milk components are not particularly limited as long as they can be used for soy milk beverages. Examples includes sugar and other sweeteners.

The content of the acetic acid bacteria-containing composition of the present invention (on a dry basis) in a soy milk beverage is preferably 0.01 to 1 mass % per 100 mass % of the soy milk beverage. The content is more preferably 0.05 to 1 mass %, even more preferably 0.1 to 0.5 mass %, and particularly preferably 0.1 to 0.2 mass %.

2-15. Coffee Beverage

The present invention according to one embodiment relates to coffee beverages (e.g., coffee) or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of coffee beverages: suppression of bitterness, suppression of harsh taste, enhancement of roasting aroma, and the like. Therefore, the acetic acid bacteria-containing composition of the present invention can be used for adjusting these flavors. From this standpoint, the present invention according to one embodiment relates to, for example, a method for adjusting the above flavors of coffee beverages or concentrates thereof, and further relates to a method for producing coffee beverages or concentrates thereof having the flavors that have been adjusted, each of these methods comprising adding the acetic acid bacteria-containing composition of the present invention to coffee beverages or concentrates thereof.

Coffee beverages are not particularly limited as long as they contain extracts of coffee beans and optionally other components. The components other than coffee bean extracts are not particularly limited as long as they can be used for coffee beverages. Examples include sugar and other sweeteners, and milk components.

The content of the acetic acid bacteria-containing composition of the present invention (on a dry basis) in a coffee beverage is preferably 0.01 to 1 mass % per 100 mass % of the coffee beverage. The content is more preferably 0.05 to 1 mass %, even more preferably 0.1 to 0.5 mass %, and particularly preferably 0.1 to 0.2 mass %.

2-16. Cocoa Beverage

The present invention according to one embodiment relates to cocoa beverages (e.g., cocoa) or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of cocoa beverages: suppression of bitterness, enhancement of richness, enhancement of sweet aroma, and the like. Therefore, the acetic acid bacteria-containing composition of the present invention can be used for adjusting these flavors. From this standpoint, the present invention according to one embodiment relates to, for example, a method for adjusting the above flavors of cocoa beverages or concentrates thereof, and further relates to a method for producing cocoa beverages or concentrates thereof having the flavors that have been adjusted, each of these methods comprising adding the acetic acid bacteria-containing composition of the present invention to cocoa beverages or concentrates thereof.

Cocoa beverages are not particularly limited as long as they contain cocoa powder and optionally other components. The components other than cocoa powder are not particularly limited as long as they can be used for cocoa beverages. Examples include sugar and other sweeteners, and milk components.

The content of the acetic acid bacteria-containing composition of the present invention (on a dry basis) in a cocoa beverage is preferably 0.01 to 1 mass % per 100 mass % of the cocoa beverage. The content is more preferably 0.05 to 1 mass %, even more preferably 0.1 to 0.5 mass %, and particularly preferably 0.1 to 0.2 mass %.

2-17. Aojiru Juice

The present invention according to one embodiment relates to aojiru juices or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of aojiru juices: suppression of harsh taste, suppression of bitterness, suppression of grassy odor, and the like. Therefore, the acetic acid bacteria-containing composition of the present invention can be used for adjusting these flavors. From this standpoint, the present invention according to one embodiment relates to, for example, a method for adjusting the above flavors of aojiru juices or concentrates thereof, and further relates to a method for producing aojiru juices or concentrates thereof having the flavors that have been adjusted, each of these methods comprising adding the acetic acid bacteria-containing composition of the present invention to aojiru juices or concentrates thereof.

Aojiru juices are not particularly limited as long as they contain aojiru powder or paste and optionally other components. Examples of aojiru powder include, but are not particularly limited to, powders of kale, barley leaves, komatsuna, and Japanese mugwort. Examples of aojiru pastes include pastes containing aojiru powders and pastes containing green leaf extracts. The components other than aojiru powder and pastes are not particularly limited as long as they can be used for aojiru juices. Examples include sugar and other sweeteners, milk components, and fruit juices.

The content of the acetic acid bacteria-containing composition of the present invention (on a dry basis) in an aojiru juice is preferably 0.01 to 1 mass % per 100 mass % of the aojiru juice. The content is more preferably 0.05 to 1 mass %, even more preferably 0.1 to 0.5 mass %, and particularly preferably 0.1 to 0.2 mass %.

2-18. Vinegar-Containing Beverage (Vinegar Drinks)

The present invention according to one embodiment relates to vinegar-containing beverages (vinegar drinks) or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of vinegar-containing beverages: suppression of stuffy smell, enhancement of fresh aroma of fruits, suppression of vinegar stimulation to the throat, suppression of lingering aftertaste of sucralose sweetness, suppression of astringent taste of yogurt (when yogurt is contained), enhancement of harmonized aroma, and the like. Therefore, the acetic acid bacteria-containing composition of the present invention can be used for adjusting these flavors. From this standpoint, the present invention according to one embodiment relates to, for example, a method for adjusting the above flavors of vinegar-containing beverages or concentrates thereof, and further relates to a method for producing vinegar-containing beverages or concentrates thereof having the flavors that have been adjusted, each of these methods comprising adding the acetic acid bacteria-containing composition of the present invention to vinegar-containing beverages or concentrates thereof.

Vinegar-containing beverages are not particularly limited as long as they contain vinegar and optionally other components. Examples of vinegar include, but are not particularly limited to, grain vinegars, such as rice vinegar, rice black vinegar, and barley black vinegar; fruit vinegars, such as apple vinegar and grape vinegar; and synthetic vinegars. The components other than vinegar are not particularly limited as long as they can be used for vinegar-containing beverages. Examples include fruit juices, sugar and other sweeteners, and yogurt.

The content of the acetic acid bacteria-containing composition of the present invention (on a dry basis) in a vinegar-containing beverage is preferably 0.01 to 1 mass % per 100 mass % of the vinegar-containing beverage. The content is more preferably 0.01 to 0.5 mass %, and even more preferably 0.04 to 0.1 mass %.

2-19. Dessert and Yogurt

The present invention according to one embodiment relates to desserts and yogurt (e.g., fruit jellies, yogurt) or concentrates thereof, each containing the acetic acid bacteria-containing composition of the present invention, and food additives for use in their preparation.

The acetic acid bacteria-containing composition of the present invention is capable of exhibiting the effect of adjusting, preferably, the following flavors of desserts and yogurt: suppression of sourness, enhancement of thick feeling, suppression of stickiness in sweetness, enhancement of fresh fruit juice feeling, and the like. Therefore, the acetic acid bacteria-containing composition of the present invention can be used for adjusting these flavors. From this standpoint, the present invention according to one embodiment relates to, for example, a method for adjusting the above flavors of desserts and yogurt or concentrates thereof, and further relates to a method for producing desserts and yogurt or concentrates thereof having the flavors that have been adjusted, each of these methods comprising adding the acetic acid bacteria-containing composition of the present invention to desserts and yogurt or concentrates thereof.

Desserts and yogurt are not particularly limited as long as they contain essential components for desserts and yogurt (e.g., gelatin or other gelling agents for jellies, and milk components for yogurt), and optionally other components. The components other than the essential components are not particularly limited as long as they can be used for desserts and yogurt. Examples include sugar and other sweeteners, and fruit juices.

The content of the acetic acid bacteria-containing composition of the present invention (on a dry basis) in a dessert or yogurt is preferably 0.01 to 1 mass % per 100 mass % of the dessert or yogurt. The content is more preferably 0.05 to 1 mass %, even more preferably 0.1 to 0.5 mass %, and particularly preferably 0.1 to 0.2 mass %.

2-20. Chocolate Snack

The present invention according to one embodiment relates to chocolate snacks (e.g., chocolate and chocolate snacks) containing the acetic acid bacteria-containing composition of the present invention and food additives for use in their preparation.

The acetic acid bacteria-containing composition of the present invention is capable of exhibiting the effect of adjusting, preferably, the following flavors of chocolate snacks: suppression of cacao bitterness, suppression of oxidation smell of oils, and the like. Therefore, the acetic acid bacteria-containing composition of the present invention can be used for adjusting these flavors. From this standpoint, the present invention according to one embodiment relates to, for example, a method for adjusting the above flavors of chocolate snacks, and further relates to a method for producing chocolate snacks having the flavors that have been adjusted, each of these methods comprising adding the acetic acid bacteria-containing composition of the present invention to chocolate snacks.

Chocolate snacks are not particularly limited as long as they contain cacao mass and optionally other components. The components other than cacao mass are not particularly limited as long as they can be used for chocolate snacks. Examples include sugar and other sweeteners, milk powder, cocoa butter, and vegetable oils. The chocolate in chocolate snacks is preferably chocolate with a high cacao content (e.g., 50% or more, 60% or more, 70% or more, or 80% or more).

The content of the acetic acid bacteria-containing composition of the present invention (on a dry basis) in a chocolate snack is preferably 0.05 to 1 mass % per 100 mass % of the chocolate snack. The content is more preferably 0.1 to 1 mass %, even more preferably 0.4 to 1 mass %, and particularly preferably 0.4 to 0.6 mass %.

2-21. Candy

The present invention according to one embodiment relates to candies (e.g., fruit juice candies, ramune soda candies, and caramels) containing the acetic acid bacteria-containing composition of the present invention, and food additives for use in their preparation.

The acetic acid bacteria-containing composition of the present invention is capable of exhibiting the effect of adjusting, preferably, the following flavors of candies: suppression of stickiness in sweetness, enhancement of fresh aroma of fruit juices, enhancement of cool sensation, enhancement of sweet aroma and richness, and the like. Therefore, the acetic acid bacteria-containing composition of the present invention can be used for adjusting these flavors. From this standpoint, the present invention according to one embodiment relates to, for example, a method for adjusting the above flavors of candies, and further relates to a method for producing candies having the flavors that have been adjusted, each of these methods comprising adding the acetic acid bacteria-containing composition of the present invention to candies.

Candies are not particularly limited as long as they contain sweetness components and optionally other components. The components other than sweetness are not particularly limited as long as they can be used for candies. Examples include fruit juices, citric acid, and milk components.

The content of the acetic acid bacteria-containing composition of the present invention (on a dry basis) in a candy is preferably 0.01 to 1 mass % per 100 mass % of the candy. For example, for a fruit juice candy, the content is more preferably 0.05 to 1 mass %, even more preferably 0.1 to 0.5 mass %, and particularly preferably 0.1 to 0.2 mass %. For example, for a ramune soda candy, the content is more preferably 0.1 to 1 mass %, even more preferably 0.4 to 1 mass %, and particularly preferably 0.4 to 0.6 mass %. For example, for a caramel, the content is more preferably 0.05 to 1 mass %, even more preferably 0.1 to 0.5 mass %, and particularly preferably 0.1 to 0.2 mass %.

2-22. Gummy

The present invention according to one embodiment relates to gummies (e.g., fruit-juice gummies) containing the acetic acid bacteria-containing composition of the present invention, and food additives for use in their preparation.

The acetic acid bacteria-containing composition of the present invention is capable of exhibiting the effect of adjusting, preferably, the following flavors of gummies: suppression of stickiness in sweetness, enhancement of fresh fruit juice feeling, and the like. Therefore, the acetic acid bacteria-containing composition of the present invention can be used for adjusting these flavors. From this standpoint, the present invention according to one embodiment relates to, for example, a method for adjusting the above flavors of gummies, and further relates to a method for producing gummies having the flavors that have been adjusted, each of these methods comprising adding the acetic acid bacteria-containing composition of the present invention to gummies.

Gummies are not particularly limited as long as they contain a gelling agent, such as gelatin, and optionally other components. The components other than gelling agents are not particularly limited as long as they can be used for gummies. Examples include fruit juices, and sugar and other sweeteners.

The content of the acetic acid bacteria-containing composition of the present invention (on a dry basis) in a gummy is preferably 0.01 to 1 mass % per 100 mass % of the gummy. The content is more preferably 0.05 to 1 mass %, even more preferably 0.1 to 0.5 mass %, and particularly preferably 0.1 to 0.2 mass %.

2-23. Retort Food Products

The present invention according to one embodiment relates to retort food products (e.g., retort hot-pot soup bases) containing the acetic acid bacteria-containing composition of the present invention, and food additives for use in their preparation.

The acetic acid bacteria-containing composition of the present invention is capable of exhibiting the effect of adjusting, preferably, the following flavors of retort food products: suppression of retort smell (metallic odor), improvement of strong flavor after heating, and the like. Therefore, the acetic acid bacteria-containing composition of the present invention can be used for adjusting these flavors. From this standpoint, the present invention according to one embodiment relates to, for example, a method for adjusting the above flavors of retort food products, and further relates to a method for producing retort food products having the flavors that have been adjusted, each of these methods comprising adding the acetic acid bacteria-containing composition of the present invention to a retort food product.

Retort food products are not particularly limited as long as they are obtained by packaging foods inside a can or a retort pouch made from a laminate of metal foil, such as aluminum. Examples of the contained foods include cooked foods, such as hot-pot soup bases, curry, curry with rice, hashed beef, hashed beef with rice, stew, bases for rice bowl dishes (e.g., beef bowl, Chinese-style rice bowl, and oyakodon (chicken and egg rice bowl)), these rice bowl dishes with rice, oden, simmered dishes, shumai, minced-meat sauce, consomme soup, pottage soup, and other soups; seasoning ingredients, such as bases for sauces (e.g., meat sauce and white sauce), bases for mapo tofu, and bases for kamameshi (a Japanese rice dish cooked in an iron pot called "kama"); processed meat products, such as Salisbury steak and meatballs; fishery food products, such as boiled fish; and cooked rice, such as white rice, sekihan (rice boiled together with red beans), gomokumeshi (Japanese pilaf), fried rice, pilaf, and rice porridge.

The content of the acetic acid bacteria-containing composition of the present invention (on a dry basis) in a retort food product is preferably 0.01 to 1 mass % per 100 mass % of the retort food product. The content is more preferably 0.05 to 1 mass %, even more preferably 0.1 to 0.5 mass %, and particularly preferably 0.1 to 0.2 mass %.

2-24. Powder Mix for Preparing Baked Confectioneries

The present invention according to one embodiment relates to powder mixes for baked confectioneries (e.g., cookie mixes, pancake mixes, cake mixes, and powders for cooking senbei) containing the acetic acid bacteria-containing composition of the present invention, baked confectioneries obtained using these powder mixes, and food additives for use in their preparation.

The acetic acid bacteria-containing composition of the present invention is capable of exhibiting the effect of adjusting, preferably, the following flavors and/or textures of baked confectioneries: suppression of stickiness in sweetness, improvement of crunchy texture, enhancement of umami of rice, improvement of crispy texture, enhancement of sweet aroma, improvement of tenderness of dough, and the like. Therefore, the acetic acid bacteria-containing composition of the present invention can be used for adjusting these flavors and/or textures. From this standpoint, the present invention according to one embodiment relates to, for example, a method for adjusting the above flavors and/or textures of baked confectioneries, and further relates to a method for producing baked confectioneries having the flavors and/or textures that have been adjusted, each of these methods comprising adding the acetic acid bacteria-containing composition of the present invention to powder mixes for baked confectioneries.

Powder mixes for baked confectioneries are not particularly limited as long as they contain raw-material powders for confectioneries (e.g., wheat flour, rice flour, and potato starch) and optionally other components. The components other than raw-material powders for confectioneries are not particularly limited as long as they can be used for powder mixes for baked confectioneries. Examples include sugar and like sweeteners.

The content of the acetic acid bacteria-containing composition of the present invention (on a dry basis) in a powder mix for baked confectioneries is preferably 0.01 to 1 mass % per 100 mass % of the powder mix for baked confectioneries. For example, for cookies and rice crackers, the content is more preferably 0.05 to 1 mass %, still more preferably 0.1 to 1 mass %, and particularly preferably 0.1 to 0.2 mass %.

2-25. Powder Mix for Preparing Noodles

The present invention according to one embodiment relates to powder mixes for preparing noodles containing the acetic acid bacteria-containing composition of the present invention, noodles obtained by using the powder mixes (containing the acetic acid bacteria-containing composition of the present invention), and food additives for use in their preparation.

The acetic acid bacteria-containing composition of the present invention is capable of exhibiting the effect of adjusting, preferably, the following flavors of noodles: enhancement of firmness of noodles, enhancement of saltiness, and the like. Therefore, the acetic acid bacteria-containing composition of the present invention can be used for adjusting these flavors. From this standpoint, the present invention according to one embodiment relates to, for example, a method for adjusting the above flavors of noodles, and further relates to a method for producing noodles having the flavors that have been adjusted, each of these methods comprising adding the acetic acid bacteria-containing composition of the present invention to powder mixes for preparing noodles.

Powder mixes for preparing noodles are not particularly limited as long as they contain raw-material powders for noodles (e.g., wheat flour and rice flour) and optionally other components. The components other than raw-material powders for noodles are not particularly limited as long as they can be used for powder mixes for preparing noodles. Examples include salt.

The content of the acetic acid bacteria-containing composition of the present invention (on a dry basis) in a powder mix for preparing noodles is preferably 0.01 to 1 mass % per 100 mass % of the powder mix for preparing noodles. The content is more preferably 0.05 to 1 mass %, even more preferably 0.1 to 0.5 mass %, and particularly preferably 0.1 to 0.2 mass %.

2-26. Solid Food Product for Vegetable Consumption

The present invention according to one embodiment relates to solid food products for vegetable consumption (e.g., vegetable bars and vegetable pastes) containing the acetic acid bacteria-containing composition of the present invention, and food additives for use in their preparation.

The acetic acid bacteria-containing composition of the present invention is capable of exhibiting the effect of adjusting, preferably, the following flavors and/or textures of solid food products for vegetable consumption: suppression of stickiness in sweetness, suppression of harsh taste of vegetables, suppression of grassy odor of vegetables, improvement of sweetness of vegetables, and the like. Therefore, the acetic acid bacteria-containing composition of the present invention can be used for adjusting these flavors and/or textures. From this standpoint, the present invention according to one embodiment relates to, for example, a method for adjusting the above flavors and/or textures of solid food products for vegetable consumption, and further relates to a method for producing solid food products for vegetable consumption having the flavors and/or textures that have been adjusted, each of these methods comprising adding the acetic acid bacteria-containing composition of the present invention to solid food products for vegetable consumption.

Solid food products for vegetable consumption are not particularly include as long as they contain vegetables (e.g., corn, beets, pumpkin, paprika, peas, edamame (green soybeans), carrots, green mung beans, tomatoes, cabbage, spinach, komatsuna, broccoli, peppers, burdock root, avocado, okra, sweet potatoes, potatoes, radish, and eggplant), and optionally other components. Examples of the state of vegetables include, but are not particularly limited to, a dry state, a crushed state (including powder), and a paste state. The components other than vegetables are not particularly limited. For example, for vegetable bars, the components may be cereal, nuts, fruits, spices, and sugars. For example, for vegetable pastes, the components may be oils (e.g., salad oil, olive oil, sesame oil, and butter), seasonings, and spices.

The content of the acetic acid bacteria-containing composition of the present invention (on a dry basis) in a solid food product for vegetable consumption is preferably 0.01 to 1 mass % per 100 mass % of the solid food product for vegetable consumption. The content is more preferably 0.05 to 1 mass %, even more preferably 0.1 to 0.5 mass %, and particularly preferably 0.1 to 0.2 mass %.

2-27. Cooking Oil

The present invention according to one embodiment relates to cooking oils and foods cooked with oils (e.g., fried foods and stir-fried foods), each containing acetic acid bacteria, and food additives for use in their preparation. Cooking oils are used for cooking fish, meat, vegetables, etc. (preferably fish, meat, etc.) by heating (e.g., frying, baking, and stir frying, preferably frying). The addition is preferably before cooking of fish, meat, vegetables, etc. by heating (e.g., frying, baking, and stir-frying, preferably frying) using an oil.

Acetic acid bacteria is capable of exhibiting the effect of adjusting, preferably, the following flavors and/or textures of cooking oils: suppression of oxidation smell of oils, suppression of burning smell of oils, suppression of the odor of raw fish, meat, etc., and the like. Therefore, acetic acid bacteria can be used for adjusting these flavors and/or textures. From this standpoint, the present invention according to one embodiment relates to, for example, a method for adjusting (or imparting an effect of adjusting) the above flavors and/or textures of cooking oils or foods cooked with oils, and further relates to a method for producing cooking oils or foods cooked with oils having the flavors and/or textures that have been adjusted (or having an effect of adjusting the flavors and/or textures), each of these methods comprising adding acetic acid bacteria to cooking oils or foods cooked with oils.

Cooking oils are not particularly limited as long they can be used for seasoning fish, meat, vegetables and the like.

The content of acetic acid bacteria (on a dry basis) in a cooking oil is preferably 0.01 to 1 mass % per 100 mass % of the cooking oil. The content is more preferably 0.05 to 1 mass %, even more preferably 0.1 to 0.5 mass %, and particularly preferably 0.1 to 0.2 mass %.

EXAMPLES

The present invention is described below in more detail with reference to Examples. However, the present invention is not limited to these Examples.

In each Test Example, amounts of components, component ratios, etc. were measured by stir bar sorptive extraction thermal desorption gas chromatography-mass spectrometry (SBSE-GC/MS).

4 g of the bacterial cell composition (cell content: 100%) was filled up with pure water to 100 g and stirred well. 1.2 mL of the thus obtained sample solution was placed in a vial. After 2 Twister stir bars (produced by Gerstel; stirrers coated with 100% polydimethylsiloxane (PDMS); film thickness: 0.5 mm; length: 10 mm) were placed in the vial, the vial was covered with a lid. Stirring was performed at room temperature for 60 minutes to adsorb aroma components.

Subsequently, the Twister stir bars were removed from the vial and washed well with pure water, and then the water was wiped off using a paper cloth. The wiped Twister stir bars were then set in a thermal desorption system (model TDU2, produced by Gerstel) and introduced into a GC/MS system and subjected to analysis. The retention time area of a peak that appeared to be due to the target component in one-dimensional analysis (1D analysis) was heart-cut at several minutes and subjected to two-dimensional gas chromatography using columns of different properties to thereby obtain a more accurate peak.

A portion of the sample was introduced into a pulsed flame photometric detector to detect a very low concentration of a sulfur-containing compound (dimethyl trisulfide) from the sample. A pulsed flame photometric detector can selectively detect only a sulfur compound by detecting light with a specific wavelength of 349 nm that is generated when a material is combusted in a reducing hydrogen flame. Even a trace amount of sulfur components can be detected. By utilizing its high selectivity, the pulsed flame photometric detector can be used for detecting a trace amount of a sulfur compound.

The GC/MS analysis and sulfur compound analysis were performed under the following conditions.

Measuring apparatus: Model codes: 7890B (GC) and 5977B (MS), produced by Agilent Technologies; MultiPurpose Sampler (auto sampler) produced by Gerstel; OI Analytical 5383 (PFPD (Pulsed Flame Photometric Detector)) (S mode), produced by OI Analytica.

Column:
1D analysis: DB WAX (produced by Agilent Technologies, 30M×0.25 mm I.D.×0.25 μm df, model number: 122-7032LTM). 2D analysis (heart-cut): DB-5 (produced by Agilent Technologies, 10M×0.18 mm I.D.×0.40 μm df, model number: 121-5013LTM). Temperature program (1D analysis): The temperature is maintained at 40° C. for 3 minutes and then raised to 240° C. at a rate of 5° C./minute.

Temperature program (2D analysis): The temperature is maintained at 40° C. until the component is heart-cut from 1D analysis, and after introduction of the component into a 2D column, the temperature is raised to 240° C. at a rate of 20° C./min and then maintained at 240° C. for 15 minutes.

Injection mode: solvent vent mode
Split: none
Carrier gas: helium, flow rate: 3.419 ml/min
Scan mode: EI 70 eV
Scan parameters: m/z 28.7 to 300

In 1D analysis, each component was detected at the following retention time (RT). (Nonanal: about 18.7 minutes, methylheptenone: about 15.7 minutes, dimethyltrisulfide: about 17.3 minutes, 2-tridecanone: about 34.9 minutes). In 2D analysis, the retention time was heat-cut at a RT of 15 to 19 minutes and a RT of 29 to 33 minutes, and components were confirmed based on the peaks of ions related to each component (nonanal: 57, 82, 98; methylheptenone: 55, 69, 108; 2-tridecanone: 43, 58, 71). Among the areas of ions of each components, the most characteristic ion area was used as the peak area (nonanal: 57, methylheptenone: 108, 2-tridecanone: 58). Dimethyl trisulfide was confirmed based on a sulphur compound detected with a PFPD (pulsed flame photometric detector) at a retention time (RT) of about 17.3 minutes, and it was used as the peak area.

The identification of nonanal, methylheptenone, dimethyl trisulfide, and 2-tridecanone was performed by adjusting the concentrations of reference samples of components (dimethyl trisulfide: produced by Fujifilm Wako Chemicals; other reference samples: produced by Tokyo Kasei Kogyo Co., Ltd.) to 100 ppm using anhydrous ethanol, then adding the adjusted reference samples to sample solutions to achieve a concentration of 1 ppm, subjecting the resulting mixtures to the same operation as the sample solutions, performing the measurement by the same method as above, and confirming that the peak positions match.

Based on the peak areas of the components (nonanal, methylheptenone, dimethyl trisulfide, and 2-tridecanone) determined and identified above, the peak area ratio of each component was calculated.

Test Example 1. Acetic Acid Bacterial Odor Evaluation Test 1

After an *Acetobacter malorum* NCI1683 strain was cultured, the medium was removed by washing, and the bacterial cells were collected and dried to obtain a 100% acetic acid bacteria powder. Subsequently, nonanal, methylheptenone, dimethyl trisulfide, and 2-tridecanone were individually added to the acetic acid bacteria powder in appropriate amounts to achieve peak area ratios of the components shown in Table 1, which were determined by SBSE-GC/MS, thus obtaining the acetic acid bacteria-containing compositions (Examples 1 to 7 and Comparative Examples 1 to 2).

The peak area value of nonanal of each of the acetic acid bacteria-containing compositions as determined by SBSE-GC/MS was approximately 1,000,000, and the nonanal content (concentration) was approximately 70 ppb.

The content (concentration) of nonanal was calculated by analyzing aroma components with known concentrations as reference samples, creating calibration curves based on the detected peak areas, and applying the peak area value of nonanal determined by SBSE-GC/MS to the calibration curves to calculate the content (concentration).

Test solutions were prepared by adding 0.1% w/w of each acetic acid bacteria-containing composition to water. Ten expert panelists whose ability to judge taste and aroma had been proven in a specific test evaluated the acetic acid bacterial odor of the test solution (odor like sweaty feet and wet socks) and scored according to the following evaluation criteria. The average score was calculated.

Specifically, the evaluation was performed in the following manner. After 10 ml of each sample was placed in a glass for a sensory test that was colored in order to make the color of the content invisible, the glass was covered with, for example, a Petri dish. In this state, the glass was turned around several times, and then the lid was opened to smell the odor. The lid was then closed and the intensity of the odor was evaluated. When the odor had left their nasal cavities, evaluation of the next sample was carried out.

Bacterial Odor Evaluation Criteria
5: No bacterial odor is sensed.
4: Almost no bacterial odor is sensed.
3: Slight bacterial odor is sensed.
2. Bacterial odor is sensed.
1. Bacterial odor is strongly sensed.
Table 1 shows the results.

Test Example 2. Acetic Acid Bacterial Odor Evaluation Test 2 and Flavor Adjustment Effect Evaluation Test 1

After an *Acetobacter malorum* NCI1683 strain was cultured, the medium was removed by washing, and the bacterial cells were collected and dried to obtain a 00% acetic acid bacteria powder. Subsequently, nonanal, methylheptenone, dimethyl trisulfide, and 2-tridecanone were individually added to the acetic acid bacteria powder in appropriate amounts to achieve peak area ratios of the components shown in Table 1, which were determined by SBSE-GC/MS, thereby obtaining acetic acid bacteria-containing compositions (Examples 8 to 16 and Comparative Examples 3 to 4). The peak area value of nonanal in each acetic acid bacteria-containing composition as determined by SBSE-GC/MS was approximately 1 million.

Each acetic acid bacteria-containing composition was added to a concentration of 0.1% w/w to the following solutions: flavor evaluation solutions (sourness evaluation solutions (an aqueous 0.5% tartaric acid solution, an aqueous 0.5% acetic acid solution, and an aqueous 0.5% citric acid solution), a bitterness evaluation solution (an aqueous 0.1% caffeine solution), a pungency evaluation solution (an aqueous $1.0 \times 10^{-6}$% capsaicin solution), a sweetness evaluation solution (an aqueous 1.0% sucrose solution), and a saltiness evaluation solution (an aqueous 0.5% salt solution), thus preparing test solutions, or each acetic acid bacteria-containing composition was added to various foods to achieve a specific concentration, thus obtaining test samples. Ten expert panelists whose ability to judge taste and aroma was proven in a specific test evaluated the acetic acid

TABLE 1

|  |  | Examples |  |  |  |  |  |  | Comparative Examples |  |
|---|---|---|---|---|---|---|---|---|---|---|
|  |  | 1 | 2 | 3 | 4 | 5 | 6 | 7 | 1 | 2 |
| Peak area ratio | Nonanal:methyl heptenone | 1:10 | 1:5.3 | 1.3:1 | 5.7:1 | 15:1 | 52:1 | 100:1 | 1:50 | 165:1 |
|  | Nonanal:dimethyl trisulfide | 1:136 | 1:74 | 1:3.2 | 1:18.7 | 5.7:1 | 25:1 | 74:1 | 1:73 | 94:1 |
|  | Nonanal:2-tridecanone | 1:50 | 1:123 | 1:35 | 2.7:1 | 75:1 | 81:1 | 324:1 | 1:284 | 1:13 |
| Average bacterial odor score |  | 3.4 | 4.1 | 4.7 | 4.9 | 4.8 | 4.3 | 3.3 | 1.2 | 1.1 |

Table 1 shows that if the peak area ratio of nonanal to methylheptenone as determined by SBSE-GC/MS (nonanal:methylheptenone) is in the range of 1:10 to 100:1, the acetic acid bacteria odor can be reduced. Table 1 further shows that acetic acid bacteria odor can be further reduced by adjusting the peak area ratio (nonanal:methylheptenone) and/or the peak area ratio of nonanal to other components (dimethyl trisulfide, 2-tridecanone).

The same test was also performed by using test solutions containing the acetic acid bacteria-containing composition in a concentration of 1% w/w or 10% w/w. The results thus obtained were similar to those shown in Table 1.

Similar effects were also confirmed to be obtained when *Komagataeibacter Gluconacetobacter xylinus* (NBRC 15237) and *Komagataeibacter europaeus* (NBRC 3261) were used.

bacterial odor of the test solutions and the test samples in the same manner as in Test Example 1. The average of the scores was calculated.

The test solutions obtained by adding each acetic acid bacteria-containing composition to the flavor evaluation solutions were evaluated in terms of changes in flavor (sourness when using the sourness evaluation solution, bitterness when using the bitterness evaluation solution, pungency when using the pungency evaluation solution, sweetness when using the sweetness evaluation solution, and saltiness when using the saltiness evaluation solution) compared to before adding the acetic acid bacteria-containing composition and scored according to the following evaluation criteria by 10 expert panelists whose ability to judge taste and aroma had been proven in a specific test. The average of the scores was calculated.12111211

Specifically, the evaluation of each flavor was performed in order from (1) to (6) below. Pungency was evaluated last.
(1) Panelists placed water in their mouth and swirled the water around inside the entire mouth and then spat the water out.

(2) The panelists placed a control solution in their mouth and swirled the solution around inside the entire mouth and then spat the solution out.
(3) The panelists placed water in their mouth and swirled the water around inside the entire mouth and then spat the water out.
(4) The panelists placed a sample solution in their mouth and swirled the solution around inside the entire mouth and then spat the solution out.
(5) The panelists evaluated the intensity of the taste of the sample relative to the control.
(6) After the taste of the sample had left the mouth by placing water in the mouth again, the next evaluation was performed.

Sourness Evaluation Criteria
As compared to the sourness before adding the acetic acid bacteria-containing composition:
 5: The sourness is significantly suppressed.
 4: The sourness is suppressed.
 3: The sourness is slightly suppressed.
 2: The sourness is minimally suppressed, but the difference is almost imperceptible.
 1: The sourness is not suppressed at all.

Bitterness Evaluation Criteria
As compared to the bitterness before adding the acetic acid bacteria-containing composition:
 5: The bitterness is significantly suppressed.
 4: The bitterness is suppressed.
 3: The bitterness is slightly suppressed.
 2: The bitterness is minimally suppressed, but the difference is almost imperceptible.
 1: The bitterness is not suppressed at all.

Pungency Evaluation Criteria
As compared to the pungency before adding the acetic acid bacteria-containing composition,
 5: The pungency is significantly suppressed.
 4: The pungency is suppressed.
 3: The pungency is slightly suppressed.
 2: The pungency is minimally suppressed, but the difference is almost imperceptible.
 1: The pungency is not suppressed at all.

Sweetness Evaluation Criteria
As compared to the sweetness before adding the acetic acid bacteria-containing composition,
 5: The sweetness is significantly suppressed.
 4: The sweetness suppressed.
 3: The sweetness is slightly suppressed.
 2: The sweetness is minimally suppressed, but the difference is almost imperceptible.
 1: The sweetness is not suppressed at all.

Saltiness Evaluation Criteria
As compared to the saltiness before adding the acetic acid bacteria-containing composition,
 5: The saltiness is significantly suppressed.
 4: The saltiness is suppressed.
 3: The saltiness is slightly suppressed.
 2: The saltiness is minimally suppressed, but the difference is almost imperceptible.
 1: The saltiness is not suppressed at all.

Tables 2 to 5 shows the results.

TABLE 2

|  |  | Examples |  |  |  |  |  |  |  |  | Comparative Examples |  |
|---|---|---|---|---|---|---|---|---|---|---|---|---|
|  |  | 8 | 9 | 10 | 11 | 12 | 13 | 14 | 15 | 16 | 3 | 4 |
| Peak area ratio | Nonanal:methylheptenone | 1:10 | 1:5.3 | 1.1:1 | 2.3:1 | 5.7:1 | 9.2:1 | 15:1 | 52:1 | 100:1 | 1:50 | 165:1 |
|  | Nonanal:dimethyl trisulfide | 1:136 | 1:74 | 1:40 | 1:27 | 1:18.7 | 1.5:1 | 10:1 | 25:1 | 74:1 | 1:73 | 94:1 |
|  | Nonanal 2-tridecanone | 1:50 | 1:123 | 1:10 | 1:5.3 | 2.7:1 | 12:1 | 20:1 | 81:1 | 324:1 | 1:284 | 1:13 |
| When the acetic acid bacteria-containing composition was added in an amount of 0.1% w/w to sourness (a 0.5% aqueous tartaric acid solution) | Bacterial odor | 3.3 | 3.7 | 4.3 | 4.5 | 4.5 | 4.5 | 4.4 | 3.7 | 3.4 | 1.2 | 1.1 |
|  | Sourness | 3.8 | 3.9 | 4.1 | 4.0 | 4.1 | 4.1 | 4.2 | 4.0 | 4.1 | 3.9 | 4.0 |
| When added in an amount of 0.1% w/w to sourness (a 0.5% aqueous acetic acid solution) | Bacterial odor | 3.1 | 3.8 | 4.2 | 4.4 | 4.4 | 4.4 | 4.3 | 3.7 | 3.3 | 1.4 | 1.2 |
|  | Sourness | 3.9 | 4.0 | 4.1 | 4.1 | 4.3 | 4.2 | 4.2 | 3.9 | 4.0 | 3.8 | 3.9 |
| When added in an amount of 0.1% w/w to sourness (a 0.5% aqueous citric acid solution) | Bacterial odor | 3.2 | 3.5 | 4.4 | 4.4 | 4.5 | 4.4 | 4.3 | 3.8 | 3.5 | 1.5 | 1.3 |
|  | Sourness | 4.0 | 4.0 | 4.4 | 4.4 | 4.5 | 4.3 | 4.4 | 4.3 | 4.2 | 4.0 | 4.1 |
| When added in an amount of 0.1% w/w to bitterness (a 0.1% caffeine solution) | Bacterial odor | 3.1 | 3.6 | 4.5 | 4.5 | 4.6 | 4.5 | 4.5 | 3.7 | 3.2 | 1.3 | 1.2 |
|  | Bitterness | 3.9 | 4.0 | 4.1 | 4.2 | 4.2 | 4.2 | 4.1 | 3.9 | 4.0 | 3.8 | 3.7 |
| When added in an amount of | Bacterial odor | 3.0 | 3.4 | 4.2 | 4.3 | 4.4 | 4.4 | 4.5 | 3.9 | 3.4 | 1.5 | 1.4 |

TABLE 2-continued

|  |  | Examples |  |  |  |  |  |  |  |  | Comparative Examples |  |
|---|---|---|---|---|---|---|---|---|---|---|---|---|
|  |  | 8 | 9 | 10 | 11 | 12 | 13 | 14 | 15 | 16 | 3 | 4 |
| 0.1% w/w to pungency (a 1.0 × $10^{-6}$% aqueous capsaicin solution) | Pungency | 3.8 | 4.1 | 4.1 | 4.0 | 4.1 | 4.2 | 4.0 | 3.8 | 4.1 | 3.9 | 3.9 |
| When added in an amount of 0.1% w/w to sweetness (a 1.0% aqueous sucrose solution) | Bacterial odor | 3.2 | 3.8 | 4.4 | 4.5 | 4.5 | 4.5 | 4.3 | 3.7 | 3.3 | 1.4 | 1.3 |
|  | Pungency | 4.0 | 4.1 | 4.2 | 4.2 | 4.2 | 4.3 | 4.2 | 4.1 | 4.0 | 3.9 | 4.0 |
| When added in an amount of 0.1% w/w to saltiness (a 0.5% aqueous NaCl solution) | Bacterial odor | 3.1 | 3.9 | 4.5 | 4.4 | 4.5 | 4.4 | 4.4 | 3.7 | 3.3 | 1.2 | 1.3 |
|  | Pungency | 3.9 | 4.0 | 3.9 | 3.9 | 4.0 | 4.1 | 4.0 | 4.1 | 3.9 | 3.8 | 3.9 |

TABLE 3

|  |  | Examples |  |  |  |  |  |  |  |  | Comparative Examples |  |
|---|---|---|---|---|---|---|---|---|---|---|---|---|
|  |  | 8 | 9 | 10 | 11 | 12 | 13 | 14 | 15 | 16 | 3 | 4 |
| Peak area ratio | Nonanal:methylheptenone | 1:10 | 1:5.3 | 1.1:1 | 2.3:1 | 5.7:1 | 9.2:1 | 15:1 | 52:1 | 100:1 | 1:50 | 165:1 |
|  | Nonanal:dimethyl trisulfide | 1:136 | 1:74 | 1:40 | 1:27 | 1:18.7 | 1.5:1 | 10:1 | 25:1 | 74:1 | 1:73 | 94:1 |
|  | Nonanal 2-tridecanone | 1:50 | 1:123 | 1:10 | 1:5.3 | 2.7:1 | 12:1 | 20:1 | 81:1 | 324:1 | 1:284 | 1:13 |
| Bacterial odor when the acetic acid bacteria-containing composition was added in an amount of 0.05% w/w to hot lemonade |  | 3.1 | 3.9 | 4.5 | 4.7 | 4.8 | 4.2 | 4.5 | 3.8 | 3.1 | 1.3 | 1.1 |
| Bacterial odor when added in an amount of 0.1% w/w to pickles |  | 3.4 | 4.1 | 4.4 | 4.7 | 4.7 | 4.6 | 4.6 | 3.8 | 3.0 | 1.2 | 2.0 |
| Bacterial odor when added in an amount of 0.3% w/w to dressing |  | 3.5 | 4.2 | 4.3 | 4.5 | 4.7 | 4.4 | 4.7 | 4.0 | 3.4 | 1.1 | 1.8 |
| Bacterial odor when added in an amount of 0.03% w/w to vinegar drink |  | 3.2 | 4.1 | 4.1 | 4.6 | 4.7 | 4.7 | 4.8 | 4.1 | 3.6 | 1.3 | 1.6 |
| Bacterial odor when added in an amount of 0.5% w/w to sesame sauce |  | 3.5 | 4.3 | 4.5 | 4.6 | 4.8 | 4.7 | 4.4 | 3.6 | 3.1 | 1.5 | 1.5 |
| Bacterial odor when added in an amount of 0.1% to orange juice |  | 3.5 | 4.0 | 4.4 | 4.6 | 4.8 | 4.8 | 4.5 | 3.8 | 3.2 | 1.7 | 1.8 |
| Bacterial odor when added in an amount of 0.1% to tomato juice |  | 3.6 | 4.1 | 4.6 | 4.4 | 4.7 | 4.6 | 4.3 | 3.9 | 3.4 | 1.4 | 1.3 |
| Bacterial odor when added in an amount of 0.4% w/w to orange jelly |  | 3.1 | 3.8 | 4.5 | 4.0 | 4.3 | 4.5 | 4.1 | 3.5 | 3.0 | 1.9 | 1.1 |
| Bacterial odor when added in an amount of 0.1% w/w to yogurt |  | 3.4 | 3.9 | 4.2 | 4.7 | 4.5 | 4.3 | 4.5 | 3.8 | 3.1 | 2.0 | 1.8 |

TABLE 4

|  |  | Examples |  |  |  |  |  |  |  |  | Comparative Examples |  |
|---|---|---|---|---|---|---|---|---|---|---|---|---|
|  |  | 8 | 9 | 10 | 11 | 12 | 13 | 14 | 15 | 16 | 3 | 4 |
| Peak area ratio | Nonanal:methylheptenone | 1:10 | 1:5.3 | 1.1:1 | 2.3:1 | 5.7:1 | 9.2:1 | 15:1 | 52:1 | 100:1 | 1:50 | 165:1 |
|  | Nonanal:dimethyl trisulfide | 1:136 | 1:74 | 1:40 | 1:27 | 1:18.7 | 1.5:1 | 10:1 | 25:1 | 74:1 | 1:73 | 94:1 |
|  | Nonanal 2-tridecanone | 1:50 | 1:123 | 1:10 | 1:5.3 | 2.7:1 | 12:1 | 20:1 | 81:1 | 324:1 | 1:284 | 1:13 |
| Bacterial odor when the acetic acid bacteria-containing composition was added in an amount of 0.1% w/w to soy milk yogurt |  | 3.3 | 4.1 | 4.6 | 4.6 | 4.6 | 4.3 | 4.3 | 3.5 | 3.1 | 1.7 | 1.6 |
| Bacterial odor when added in an amount of 0.5% w/w to pickled ume plum |  | 3.1 | 3.8 | 4.3 | 4.7 | 4.6 | 4.8 | 4.7 | 3.9 | 3.3 | 1.3 | 2.0 |

TABLE 4-continued

|  | Examples | | | | | | | | | Comparative Examples | |
| --- | --- | --- | --- | --- | --- | --- | --- | --- | --- | --- | --- |
|  | 8 | 9 | 10 | 11 | 12 | 13 | 14 | 15 | 16 | 3 | 4 |
| Bacterial odor when added in an 0.1% w/w to iced coffee | 3.3 | 4.0 | 4.7 | 4.9 | 4.9 | 4.6 | 4.6 | 4.1 | 3.5 | 1.5 | 1.6 |
| Bacterial odor when added in an amount of 0.4% w/w to high-cacao chocolate | 3.2 | 3.7 | 4.2 | 4.3 | 4.6 | 4.5 | 4.3 | 3.6 | 3.0 | 1.3 | 1.4 |
| Bacterial odor when added in an amount of 0.3% w/w to fermented soybeans | 3.3 | 3.9 | 4.1 | 4.5 | 4.5 | 4.3 | 4.3 | 3.6 | 3.0 | 1.6 | 1.4 |
| Bacterial odor when added in an amount of 0.1% w/w to cocoa | 3.5 | 4.1 | 4.6 | 4.6 | 4.7 | 4.5 | 4.4 | 3.7 | 3.2 | 2.0 | 1.8 |
| Bacterial odor when added in an amount of 0.04% w/w to a beverage containing lemon pectin | 3.3 | 4.0 | 4.5 | 4.6 | 4.7 | 4.6 | 4.6 | 4.0 | 3.6 | 1.5 | 1.7 |
| Bacterial odor when added in an amount of 0.2% w/w to kimchi | 3.6 | 4.2 | 4.7 | 4.5 | 4.6 | 4.7 | 4.5 | 3.8 | 3.2 | 1.5 | 2.0 |

TABLE 5

|  |  | Examples | | | | | | | | | Comparative Examples | |
| --- | --- | --- | --- | --- | --- | --- | --- | --- | --- | --- | --- | --- |
|  |  | 8 | 9 | 10 | 11 | 12 | 13 | 14 | 15 | 16 | 3 | 4 |
| Peak area ratio | Nonanal:methylheptenone | 1:10 | 1:5.3 | 1.1:1 | 2.3:1 | 5.7:1 | 9.2:1 | 15:1 | 52:1 | 100:1 | 1:50 | 165:1 |
|  | Nonanal:dimethyl trisulfide | 1:136 | 1:74 | 1:40 | 1:27 | 1:18.7 | 1.5:1 | 10:1 | 25:1 | 74:1 | 1:73 | 94:1 |
|  | Nonanal 2-tridecanone | 1:50 | 1:123 | 1:10 | 1:5.3 | 2.7:1 | 12:1 | 20:1 | 81:1 | 324:1 | 1:284 | 1:13 |
| Bacterial odor when the acetic acid bacteria-containing composition was added in an amount of 0.02% w/w to miso soup | | 3.1 | 3.6 | 4.3 | 4.4 | 4.5 | 4.3 | 4.3 | 3.8 | 3.1 | 1.3 | 2.1 |
| Bacterial odor when added in an amount of 0.2% w/w to hard candy | | 3.6 | 4.1 | 4.5 | 4.6 | 4.6 | 4.3 | 4.0 | 3.4 | 3.0 | 1.4 | 1.5 |
| Bacterial odor when added in an amount of 0.1% w/w to gummy | | 3.2 | 3.9 | 4.4 | 4.6 | 4.7 | 4.6 | 4.5 | 3.8 | 3.2 | 1.5 | 1.3 |
| Bacterial odor when added in an amount of 0.2% w/w to soft candy | | 3.4 | 4.2 | 4.7 | 4.5 | 4.7 | 4.5 | 4.6 | 3.5 | 3.1 | 1.6 | 1.3 |
| Bacterial odor when added in an amount of 0.3% w/w to tablet candy | | 3.1 | 3.7 | 4.1 | 4.3 | 4.4 | 4.3 | 4.5 | 3.8 | 3.4 | 1.9 | 1.6 |
| Bacterial odor when added in an amount of 0.4% w/w to milk chocolate | | 3.2 | 3.9 | 4.4 | 4.5 | 4.5 | 4.4 | 4.7 | 4.0 | 3.3 | 1.1 | 1.5 |
| Bacterial odor when added in an amount of 0.1% w/w to steamed beef | | 3.0 | 3.6 | 4.3 | 4.7 | 4.8 | 4.1 | 4.3 | 3.6 | 3.1 | 1.2 | 1.4 |
| Bacterial odor when added in an amount of 0.1% w/w to aojiru juice | | 3.3 | 4.0 | 4.6 | 4.5 | 4.6 | 4.3 | 4.1 | 3.5 | 3.0 | 1.6 | 1.7 |

Tables 2 to 5 show that when the acetic acid bacteria-containing composition that has a peak area ratio of nonanal to methylheptenone (nonanal:methylheptenone) in the range of 1:10 to 100:1 as determined by SBSE-GC/MS is used, the acetic acid bacterial odor can be reduced in flavor evaluation solutions (test solutions having sourness, bitterness, pungency, sweetness, or saltiness) and various foods containing the acetic acid bacteria-containing composition. Tables 2 to 5 further show that the flavor can be adjusted by adding acetic acid bacteria.

The above results show that when using a acetic acid bacteria-containing composition with a peak area ratio of nonanal to methylheptenone (nonanal:methylheptenone) in the range of 1:10 to 100:1, the flavor can be adjusted while reducing the acetic acid bacterial odor.

Example 3: Flavor and Texture Adjustment Effect Evaluation Test

Test samples were prepared by adding the acetic acid bacteria-containing composition of Example 4 to various foods at a specific concentration. Ten expert panelists whose ability to judge taste and aroma had been proven in a specific test evaluated various flavors and texture and scored them according to the following criteria. The average of the scores was calculated.

Flavor or Texture Intensity Evaluation Criteria
  5: Strong flavor or texture is sensed.
  4: Slightly strong flavor or texture is sensed.
  3: The same level of flavor or texture as the control (a composition not containing acetic acid bacteria) is sensed.
  2: Slightly weak flavor or texture is sensed.
  1: Weak flavor or texture is sensed.

Deliciousness Evaluation Criteria
  5: Delicious
  4: Slightly delicious
  3: As delicious as the control (a composition not containing acetic acid bacteria)
  2: Slightly less delicious
  1: Not delicious In addition, the food was comprehensively evaluated based on the following evaluation criteria.

A: A clearly more favorable effect than that of the control (a composition not containing acetic acid bacteria) is observed.
B: A more favorable effect than that of the control (a composition not containing acetic acid bacteria) is observed.
C: A slightly more favorable effect than that of the control (a composition not containing acetic acid bacteria) is observed.
D: No effects more advantageous than those of the control (a composition not containing acetic acid bacteria) are observed.

In each of the following Test Examples, the numerical values in recipe tables are expressed in parts by weight.

Test Example 3-1. Vinegared Dish

TABLE 6

| Recipe | |
|---|---|
| Cucumber | 50 |
| Wakame seaweed (soaked in water) | 10 |

TABLE 6-continued

| Recipe | |
|---|---|
| Seasoning vinegar | |
| Grain vinegar | 22.5 |
| Soy sauce | 9 |
| Sugar | 9 |
| | 100.5 |

The cucumber was cut into thin slices and rubbed with salt. Wakame seaweed was soaked in water, gently squeezed, and cut into bite-sized pieces. The acetic acid bacteria-containing composition was added to seasoning vinegar in the proportions shown in the table below, and mixed well with ingredients to prepare a vinegared dish.

The vinegared dish was tested and evaluated by 10 panelists. The table below shows the results.

TABLE 7

| Amount of acetic acid bacteria-containing composition added (%) w/w | Grassy odor of cucumber | Sea odor of wakame seaweed | Intensity of saltiness | Sourness, acidic smell | Overall deliciousness | Comprehensive evaluation | Notes |
|---|---|---|---|---|---|---|---|
| 0.00 | — | — | — | — | — | C | |
| 0.01 | 2.9 | 2.9 | 3.0 | 2.9 | 3.1 | C | |
| 0.05 | 2.3 | 2.5 | 3.5 | 2.5 | 3.5 | B | |
| 0.10 | 1.8 | 2.2 | 4.2 | 2.1 | 4.5 | A | Best results |
| 0.50 | 1.6 | 1.9 | 4.3 | 1.9 | 4.5 | A | |
| 1.00 | 1.5 | 1.8 | 4.4 | 1.7 | 3.3 | B | Slight bacterial sedimentation and rough feeling to the palate |

Test Example 3-2. Apple-Based Vinegar Drink

TABLE 8

| Recipe | |
|---|---|
| Pure brown rice black vinegar | 15 |
| 100% apple juice | 7.5 |
| Sucralose | 0.03 |
| Water | 200 |
| | 222.53 |

A vinegar drink was prepared according to the recipe. The acetic acid bacteria-containing composition was added in each of the proportions shown in the table below and stirred well. The resulting vinegar drinks were tasted and evaluated by 10 panelists. The table below shows the results.

TABLE 9

| Amount of acetic acid bacteria-containing composition added (%) w/w | Stuffy smell of black vinegar | Fresh scent of apples | Vinegar stimulation to the throat | Lingering sweetness aftertaste | Overall deliciousness | Comprehensive evaluation | Comments |
|---|---|---|---|---|---|---|---|
| 0.00 | — | — | — | — | — | — | |
| 0.01 | 2.7 | 3.2 | 2.5 | 2.7 | 3.3 | B | |

TABLE 9-continued

| Amount of acetic acid bacteria-containing composition added (%) w/w | Stuffy smell of black vinegar | Fresh scent of apples | Vinegar stimulation to the throat | Lingering sweetness aftertaste | Overall deliciousness | Comprehensive evaluation | Comments |
|---|---|---|---|---|---|---|---|
| 0.05 | 2.2 | 3.9 | 1.8 | 2.1 | 4.3 | A | |
| 0.10 | 2.1 | 4.0 | 1.7 | 1.9 | 4.4 | A | |
| 0.50 | 1.9 | 4.1 | 1.7 | 1.8 | 3.9 | B | |
| 1.00 | 1.7 | 4.0 | 1.6 | 1.7 | 3.5 | C | Concern about bacterial sedimentation and rough feeling to the palate |

Test Example 3-3. Sesame Sauce

TABLE 10

| Recipe | |
|---|---|
| White sesame paste | 4 |
| 1 tablespoon of soy sauce | 5 |
| Vinegar | 7.5 |
| Cooking sake | 1.4 |
| Sugar | 0.3 |
| Mustard | 1 |
| | 19.2 |

A sesame sauce was prepared according to the above recipe. The acetic acid bacteria-containing composition was added to the sesame sauce in each of the proportions shown in the table below. Pork belly was boiled in an appropriate amount and served with lettuce. Ten panelists tasted and evaluated the pork belly and lettuce dipped into the sesame sauce. The table below shows the results.

TABLE 11

| Amount of acetic acid bacteria-containing composition added (%) w/w | Thick feeling of sesame | Roasting aroma of sesame | Sourness, acidic smell | Overall deliciousness | Comprehensive evaluation | Comments |
|---|---|---|---|---|---|---|
| 0.00 | — | — | — | — | — | |
| 0.01 | 3.7 | 3.5 | 2.1 | 3.5 | B | |
| 0.05 | 4.1 | 4.2 | 1.6 | 4.1 | A | Best results |
| 0.10 | 4.3 | 4.3 | 1.5 | 4.1 | A | |
| 0.50 | 4.4 | 4.2 | 1.4 | 3.9 | B | |
| 1.00 | 4.5 | 4.3 | 1.4 | 3.2 | C | Concern about bacterial sedimentation and rough feeling to the palate |

Test Example 3-4. Hot Milk

After milk (Meiji Oishii Gyunyu) was heated in a microwave oven (600 W), the acetic acid bacteria-containing composition was added in each of the proportions shown below and evaluated by 10 panelists. The table below shows the results.

TABLE 12

| Amount of acetic acid bacteria-containing composition added (%) w/w | Milky odor | Creami-ness | Overall delicious-ness | Compre-hensive evaluation | Notes |
|---|---|---|---|---|---|
| 0.00 | — | — | — | — | |
| 0.01 | 2.7 | 3.3 | 3.3 | B | |
| 0.05 | 2.2 | 3.9 | 4.1 | A | Best results |
| 0.10 | 2.1 | 4.0 | 4.2 | A | |
| 0.50 | 1.9 | 3.9 | 3.7 | B | Slight concern about bacterial sedimentation |
| 1.00 | 1.9 | 3.8 | 3.2 | C | Slight bacterial sedimentation and rough feeling to the palate |

Test Example 3-5. High-Cacao Chocolate

High-cacao chocolate (Meiji Chocolate Effect, 72% cacao) was crushed into small pieces and melted smoothly in boiling water at 50° C. The acetic acid bacteria-containing composition was then added in each of the proportions shown below and mixed well. While tempering, the dough was squeezed out in 1-g portions with a cornet at around 30° C., formed again, and tasted by 10 panelists. The table below shows the results.

TABLE 13

| Amount of acetic acid bacteria-containing composition added (%) w/w | Bitter-ness of cacao | Oxidation smell of oils | Overall delicious-ness | Compre-hensive evaluation | Notes |
|---|---|---|---|---|---|
| 0.00 | — | — | — | — | |
| 0.01 | 3.0 | 2.9 | 3.0 | D | |
| 0.05 | 2.8 | 2.9 | 3.2 | C | |
| 0.10 | 2.2 | 2.0 | 3.7 | B | |
| 0.50 | 1.7 | 1.9 | 4.3 | A | Best results: clearly reduced bitterness and easy to eat |
| 1.00 | 1.5 | 1.9 | 4.2 | A | |

Test Example 3-6. Yogurt

TABLE 14

| Recipe | |
|---|---|
| Whole milk | 100 |
| Kefir Probiotic GBN1 | 0.1 |
| | 100.1 |

0.1 g of Kefir robiotic GBN1 and the acetic acid bacteria-containing composition in each of the proportions shown below were added to 100 g of whole milk. The resulting mixture was placed in a thermostatic bath at 42° C. for 15 hours and then cooled in a refrigerator. Yoghurt prepared according to the above recipe was tasted and evaluated by 10 panelists. The table below shows the results.

TABLE 15

| Amount of acetic acid bacteria-containing composition added (%) w/w | Sourness | Thick feeling (creami-ness) | Overall delicious-ness | Compre-hensive evaluation | Notes |
|---|---|---|---|---|---|
| 0.00 | — | — | — | — | |
| 0.01 | 2.9 | 3.1 | 3.2 | C | |
| 0.05 | 2.6 | 3.3 | 3.5 | B | |
| 0.10 | 1.8 | 3.9 | 4.2 | A | Best results |
| 0.50 | 1.7 | 4.0 | 4.2 | A | |
| 1.00 | 1.5 | 4.2 | 3.7 | B | Slight rough feeling of acetic acid bacteria cells |

Test Example 3-7. Sushi Rice

TABLE 16

| Recipe | |
|---|---|
| Rice | 150 |
| Sushi vinegar | |
| Rice vinegar | 20 |
| Sugar | 9 |
| Salt | 6 |
| | 35 |

Rice was cooked hard with water in an amount for sushi rice in a rice cooker. Sushi vinegar was mixed well with the acetic acid bacteria-containing composition in each of the proportions shown in the table below. The resulting mixture was poured over the rice in circles, and the vinegared rice was mixed well in cutting motions and then cooled. Sushi rice prepared according to the above recipe was tasted and evaluated by 10 panelists. The table below shows the results.

TABLE 17

| Amount of acetic acid bacteria-containing composition added (%) w/w | Stickiness of rice | Sourness, acidic smell | Sweetness of rice after standing 24 hours | Smell of rice deterioration after standing 48 hours | Overall deliciousness | Comprehensive evaluation | Notes |
|---|---|---|---|---|---|---|---|
| 0.00 | — | — | — | — | — | — | |
| 0.05 | 2.7 | 2.5 | 3.0 | 2.9 | 3.2 | C | |
| 0.10 | 2.5 | 2.3 | 3.4 | 2.6 | 3.5 | B | |
| 0.50 | 1.8 | 2.0 | 3.9 | 2.0 | 4.4 | A | Best results |
| 1.00 | 1.6 | 1.8 | 4.2 | 1.9 | 4.5 | A | |
| 2.00 | 1.6 | 1.6 | 4.1 | 1.7 | 3.2 | C | Rough feeling of the acetic acid bacteria-containing composition |

Test Example 3-8. Pickles

TABLE 18

| Recipe | |
|---|---|
| Cucumber | 30 |
| Carrot | 30 |
| Paprika (sweet bell pepper) | 30 |
| Pickle seasoning | g |
| Grain vinegar | 75 |
| Sugar | 45 |
| Salt | 9 |
| Spices | |
| Bay leave | 1 |
| Black peppercorns | 3 |

The cucumber was cut to a length of 4 cm and further cut into four lengthwise. The carrot was cut into strips of 4 cm in length. The paprika was cut into strips of 5 mm in width. The cut vegetables were placed into a zipper storage bag, and a pickle seasoning liquid containing the acetic acid bacteria-containing composition in each of the proportions shown in the table below was poured into the bag. After the air was removed, the bag was zipped up and the vegetables were rubbed for 30 seconds and then kept in a refrigerator for 40 minutes. Pickles prepared according to the above recipe were tasted and evaluated by 10 panelists. The table below shows the results.

TABLE 19

| Amount of acetic acid bacteria-containing composition added (%) w/w | Crispiness of vegetables | Soaked taste | Flavor of spices | Sourness, acidic smell | Overall deliciousness | Comprehensive evaluation | Notes |
|---|---|---|---|---|---|---|---|
| 0.00 | — | — | — | — | — | — | |
| 0.01 | 3.1 | 3.1 | 3.0 | 2.9 | 3.1 | C | |
| 0.05 | 3.3 | 3.5 | 3.5 | 2.5 | 3.3 | B | |
| 0.10 | 4.2 | 3.8 | 4.2 | 2.0 | 4.3 | A | Best results |
| 0.50 | 4.4 | 4.1 | 4.3 | 1.9 | 4.4 | A | |
| .00 | 4.5 | 4.2 | 4.4 | 1.7 | 3.6 | B | Slight concern about bacterial sedimentation |

Test Example 3-9. Hot Lemonade

TABLE 20

| Recipe | |
|---|---|
| Sunkist 100% lemon | 30 |
| Honey | 21 |
| Hot water | 150 |
| | 201 |

Hot lemonade was prepared according to the above recipe and the acetic acid bacteria-containing composition was added in each of the proportions shown in the table below. The resulting mixture was stirred well, and tasted and evaluated by 10 panelists. The table below shows the results.

TABLE 21

| Amount of acetic acid bacteria-containing composition added (%) w/w | Lemon juice feeling | Flavor of honey | Sourness | Overall deliciousness | Comprehensive evaluation | Notes |
|---|---|---|---|---|---|---|
| 0.00 | — | — | — | — | — | |
| 0.01 | 3.3 | 3.1 | 3.0 | 3.4 | B | |
| 0.05 | 3.8 | 3.7 | 2.4 | 4.1 | A | Best results |
| 0.10 | 3.9 | 3.8 | 2.2 | 4.2 | A | |
| 0.50 | 4.1 | 3.8 | 1.9 | 3.8 | B | Slight concern about bacterial sedimentation |
| 1.00 | 4.1 | 3.9 | 1.8 | 3.3 | C | Rough feeling of bacterial cells to the tongue; slight bacterial sedimentation and rough feeling to the palate |

Test Example 3-10. Ponzu (Japanese Sauce Made Primarily of Soy Sauce and Citrus Juice)

TABLE 22

| Recipe | |
|---|---|
| Grain vinegar | 60 |
| Soy sauce | 80 |
| Mirin (sweet cooking sake) | 60 |
| Yuzu juice | 40 |
| | 240 |

TABLE 23

| Dashi ingredients | |
|---|---|
| Kelp | 10 (10 cm × 10 cm) |
| Bonito | 10 g |
| Mizutaki (estimated for 4 people) (Japanese hot-pot dish prepared by cooking chicken, vegetables, etc. in water and served with dipping sauce) | |
| Chicken thigh | 150 |
| Chinese cabbage | 300 |
| Shiitake mushroom | 40 (stems removed) |
| Japanese leek | 200 |
| Carrot | 150 |

Put 10 cm of kelp and water in a pot and remove the kelp immediately before boiling. Cut the above ingredients into bite-sized pieces and put the chicken thigh into the pan. After the chicken thigh is semi-cooked, add the rest of the ingredients and cook until tender. Prepare ponzu according to the recipe, add ingredients for dashi (soup stock) and keep the resulting mixture in a refrigerator overnight. Separate the liquid portion by filtration. Add the acetic acid bacteria-containing composition in each of the proportions shown in the table below and stir well.

The resulting ponzu was used for mizutaki and tasted and evaluated by 10 panelists. The table below shows the results.

TABLE 24

| Amount of acetic acid bacteria-containing composition added (%) w/w | Fresh aroma of yuzu | Chemical odor | Meat odor | Soy sauce spiciness | Blur taste (intensity of taste) when diluted 3 times with the pot broth | Overall deliciousness | Comprehensive evaluation | Notes |
|---|---|---|---|---|---|---|---|---|
| 0.00 | — | — | — | — | — | — | — | |
| 0.01 | 3.5 | 2.8 | 2.9 | 3.0 | 3.3 | 3.5 | B | |
| 0.05 | 3.9 | 2.5 | 2.7 | 2.7 | 3.7 | 4.0 | A | |
| 0.10 | 4.1 | 2.0 | 2.3 | 2.5 | 3.9 | 4.2 | A | Best results |
| 0.50 | 4.3 | 2.0 | 2.1 | 2.3 | 4.0 | 3.8 | B | |
| 1.00 | 4.5 | 1.8 | 2.00 | 2.3 | 4.1 | 3.4 | C | Slight bacterial sedimentation |

Test Example 3-11. Hot Broth (Udon Noodle Broth)

TABLE 25

| Recipe Dashi broth | |
|---|---|
| Kelp | 10 (10-cm square) |
| Bonito flakes | 10 |
| Water | 600 |
| Soy sauce | 36 |
| Sugar | 9 |
| Salt | 3 |

Dashi of bonito and kelp was extracted as usual, and soy sauce, sugar, and salt were added and completely dissolved. The acetic acid bacteria-containing composition was added in each of the proportions shown in the table below and stirred well. The resulting dashi was tasted and evaluated by 10 panelists. The table below shows the results.

TABLE 26

| Amount of acetic acid bacteria-containing composition added (%) w/w | Aroma of dashi | Raw odor of dashi | Sharp saltiness | Umami | Overall deliciousness | Comprehensive evaluation | Notes |
|---|---|---|---|---|---|---|---|
| 0.00 | — | — | — | — | — | — | |
| 0.01 | 3.3 | 2.8 | 3.0 | 3.0 | 3.2 | C | |
| 0.05 | 3.9 | 2.4 | 2.5 | 3.3 | 3.6 | B | |
| 0.10 | 4.0 | 2.2 | 2.4 | 3.5 | 4.0 | A | Best results |
| 0.50 | 4.1 | 2.1 | 2.3 | 3.9 | 4.0 | A | |
| 1.00 | 4.2 | 1.9 | 2.3 | 4.1 | 3.8 | B | Slight bacterial sedimentation |

Test Example 3-12. Retort Yosenabe (Mixed Stew) Broth

TABLE 27

| Recipe Dashi broth | |
|---|---|
| Water | 800 |
| Kelp | 13 |
| Dried bonito flakes | 13 |
| Light soy sauce | 58 |
| Sake | 30 |
| Mirin (sweet cooking sake) | 38 |
| Salt | 5 |

Dashi of bonito and kelp was extracted as usual. Light soy sauce, sake, mirin (sweet sake for cooking), and salt were heated and completely dissolved. The acetic acid bacteria-containing composition was added in each of the proportions shown in the table below, stirred well, placed in a pouch, and retort-sterilized at 120° C. for 20 minutes. The resulting yosenabe broth was tasted and evaluated by 10 panelists. The table below shows the results.

TABLE 28

| Amount of acetic acid bacteria-containing composition added (%) w/w | Retort smell (metallic odor) | Flavor intensity after heating on low heat for 60 minutes | Overall deliciousness | Comprehensive evaluation | Notes |
|---|---|---|---|---|---|
| 0.00 | — | — | — | — | |
| 0.01 | 2.7 | 3.0 | 3.1 | C | |
| 0.05 | 2.3 | 3.4 | 3.4 | B | |
| 0.10 | 2.0 | 3.8 | 4.0 | A | Best results |
| 0.50 | 2.0 | 3.9 | 4.0 | A | |
| 1.00 | 1.8 | 3.9 | 3.6 | B | Slight bacterial sedimentation |

Test Example 3-13. Seasoning for Rice Balls

TABLE 29

| Recipe Seasonings for omusubi (rice balls) | |
|---|---|
| Sesame oil | 0.6 |
| Komatsuna spinach | 9.5 |
| Baby sardines | 4.8 |
| Dried bonito flakes | 1.0 |
| Soy sauce | 0.9 |
| Salt | 1.4 |
| Mirin (sweet cooking sake) | 0.6 |
| Sesame seeds | 1.0 |
| | 20 |
| Warm cooked rice | 640 |

A frying pan was heated with sesame oil. Chopped komatsuna spinach, baby sardines, and dried bonito flakes were placed in the heated pan. After seasoning with soy sauce, salt, and mirin, sesame seeds were added and stir-fried until crispy. The acetic acid bacteria-containing composition was added in each of the proportions shown in the table below and the resulting mixture was mixed well. Omusubi rice balls were prepared by using the resulting seasoning mixture, cooled to room temperature, and then tasted and evaluated by 10 panelists. The table below shows the results.

TABLE 30

| Amount of acetic acid bacteria-containing composition added (%) w/w | Saltiness | Stickiness of rice | Rice odor | Unevenness in taste | Overall deliciousness | Comprehensive evaluation | Notes |
|---|---|---|---|---|---|---|---|
| 0.00 | — | — | — | — | — | — | |
| 0.01 | 3.3 | 2.9 | 3.0 | 3.0 | 3.4 | B | |
| 0.05 | 3.7 | 2.3 | 2.5 | 2.7 | 3.8 | A | Best results |
| 0.10 | 3.9 | 2.2 | 2.3 | 2.5 | 4.0 | A | |
| 0.50 | 4.0 | 2.2 | 1.7 | 2.3 | 3.8 | B | |
| 1.00 | 4.1 | 2.1 | 1.6 | 2.1 | 3.3 | C | Slight concern about bacterial odor |

Test Example 3-14. Fermented Soybeans

Fermented soybeans were broken up well and sprinkled with the acetic acid bacteria-containing composition in each of the proportions shown below and then mixed well. The resulting fermented soybeans were tasted and evaluated by 10 panelists. The table below shows the results.

TABLE 31

| Amount of acetic acid bacteria-containing composition added (%) w/w | Bitterness | Fermented soybean smell | Overall deliciousness | Comprehensive evaluation | Notes |
|---|---|---|---|---|---|
| 0.00 | — | — | — | — | |
| 0.05 | 2.9 | 2.7 | 3.1 | C | |
| 0.10 | 2.5 | 2.3 | 3.5 | B | |
| 0.50 | 2.1 | 1.9 | 4.1 | A | Best results |
| 1.00 | 2.0 | 1.8 | 4.1 | A | |
| 5.00 | 1.8 | 1.8 | 3.2 | C | Slightly rough mouth feel due to the bacteria |

Test Example 3-15. Grapefruit Juice

The acetic acid bacteria-containing composition was added to 100% grapefruit juice (reduced concentrate) in each of the following proportions shown in the table below. The resulting juice was tasted and evaluated by 10 panelists. The table below shows the results.

TABLE 32

| Amount of acetic acid bacteria-containing composition added (%) w/w | Bitterness | Fresh aroma of fruit juice | Hot and humid heating smell (associated with concentration reduction) | Overall deliciousness | Comprehensive evaluation | Notes |
|---|---|---|---|---|---|---|
| 0.00 | — | — | — | — | — | |
| 0.01 | 2.9 | 3.1 | 2.8 | 3.2 | C | |
| 0.05 | 2.5 | 3.3 | 2.5 | 3.6 | B | |
| 0.10 | 2.1 | 3.5 | 2.2 | 4.4 | A | Best results |
| 0.50 | 1.8 | 3.7 | 2.1 | 4.5 | A | |
| 1.00 | 1.6 | 3.8 | 2.0 | 3.8 | B | Slight concern about bacterial sedimentation |

Test Example 3-16. Tomato Juice

The acetic acid bacteria-containing composition was added to 100% tomato juice (reduced concentrate) in each of the proportions shown in the table below. The resulting juice was tasted and evaluated by 10 panelists. The table below shows the results.

TABLE 33

| Amount of acetic acid bacteria-containing composition added (%) w/w | Grassy odor | Sourness | Thick feeling | Overall deliciousness | Comprehensive evaluation | Notes |
|---|---|---|---|---|---|---|
| 0.00 | — | — | — | — | — | |
| 0.01 | 3.0 | 2.8 | 3.1 | 3.3 | C | |
| 0.05 | 2.8 | 2.4 | 3.2 | 3.6 | B | |
| 0.10 | 2.5 | 2.1 | 3.5 | 4.1 | A | Best results |
| 0.50 | 2.4 | 2.0 | 3.6 | 4.1 | A | |
| 1.00 | 2.3 | 1.9 | 3.6 | 3.9 | B | |

Test Example 3-17. Aojiru Green Juice

FANCL Frozen Aojiru Premium was thawed, and the acetic acid bacteria-containing composition was added in each of the proportions shown in the table below. The resulting juice was tasted and evaluated by 10 panelists. The table below shows the results.

TABLE 34

| Amount of acetic acid bacteria-containing composition added (%) w/w | Harsh taste, bitterness | Grassy odor | Overall deliciousness | Comprehensive evaluation | Notes |
|---|---|---|---|---|---|
| 0.00 | — | — | — | — | |
| 0.01 | 3.0 | 3.0 | 3.0 | C | |
| 0.05 | 2.7 | 2.9 | 3.5 | B | |
| 0.10 | 2.3 | 2.6 | 3.9 | A | Best results |
| 0.50 | 2.1 | 2.5 | 4.0 | A | |
| 1.00 | 1.9 | 2.1 | 3.9 | B | |

Test Example 3-18. Soy Milk

The acetic acid bacteria-containing composition was added to unmodified soy milk in each of the proportions shown below. The resulting soy milk was tasted and evaluated by 10 panelists. The table below shows the results.

TABLE 35

| Amount of acetic acid bacteria-containing composition added (%) w/w | Grassy odor | Milk feeling (thick feeling like milk) | Overall deliciousness | Comprehensive evaluation | Notes |
|---|---|---|---|---|---|
| 0.00 | — | — | — | — | |
| 0.01 | 2.5 | 3.0 | 3.2 | C | |
| 0.05 | 2.3 | 3.4 | 3.6 | B | |
| 0.10 | 2.0 | 3.7 | 4.1 | A | Best results |
| 0.50 | 1.8 | 3.8 | 4.0 | A | |
| 1.00 | 1.7 | 3.9 | 3.8 | B | Slight bacterial sedimentation |

Test Example 3-19. Cocoa (Unsweetened)

TABLE 36

| Recipe | |
|---|---|
| Morinaga Pure Cocoa | 5 |
| Boiling water | 10 |
| Warmed milk | 120 |
| | 135 |

Cocoa was prepared according to the above recipe, and the acetic acid bacteria-containing composition was added in each of the proportions shown in the table below. The resulting cocoa was tasted and evaluated by 10 panelists. The table below shows the results.

TABLE 37

| Amount of acetic acid bacteria-containing composition added (%) w/w | Bitterness | Richness | Sweet aroma | Overall deliciousness | Comprehensive evaluation | Notes |
|---|---|---|---|---|---|---|
| 0.00 | — | — | — | — | — | |
| 0.01 | 2.6 | 3.0 | 3.0 | 3.2 | C | |
| 0.05 | 2.1 | 3.3 | 3.5 | 3.5 | B | |
| 0.10 | 1.8 | 3.7 | 3.9 | 3.9 | A | Best results |
| 0.50 | 1.6 | 3.9 | 4.0 | 3.9 | A | |
| 1.00 | 1.5 | 3.9 | 3.9 | 3.7 | B | Slight bacterial sedimentation |

Test Example 3-20. Iced Coffee

The acetic acid bacteria-containing composition was added to unsweetened iced coffee in each of the proportions shown in the table below. The resulting iced coffee was tasted and evaluated by 10 panelists. The table below shows the results.

TABLE 38

| Amount of acetic acid bacteria-containing composition added (%) w/w | Bitterness | Harsh taste | Roasting aroma | Overall deliciousness | Comprehensive evaluation | Notes |
|---|---|---|---|---|---|---|
| 0.00 | — | — | — | — | — | |
| 0.01 | 2.5 | 3.0 | 3.0 | 3.2 | C | |
| 0.05 | 2.3 | 2.6 | 3.3 | 3.6 | B | |
| 0.10 | 2.0 | 2.3 | 3.5 | 4.1 | A | Best results |
| 0.50 | 1.8 | 2.0 | 3.6 | 4.0 | A | |
| 1.00 | 1.7 | 1.9 | 3.7 | 3.8 | B | Slight bacterial sedimentation |

Test Example 3-21. Miso Soup

TABLE 39

| Recipe | |
|---|---|
| Dashi soup | 200 |
| Miso (fermented soybean paste) | 36 |
| | 236 |

A mixed dashi of bonito and kelp was prepared as usual and mixed with miso containing the acetic acid bacteria-containing composition in each of the proportions shown in the table below. Miso soup was prepared according to the above recipe and tasted and evaluated by 10 panelists. The table below shows the results.

TABLE 40

| Amount of acetic acid bacteria-containing composition added (%) w/w | Saltiness | Harsh taste | Aroma of miso | Overall deliciousness | Comprehensive evaluation | Notes |
|---|---|---|---|---|---|---|
| 0.00 | — | — | — | — | — | |
| 0.01 | 3.1 | 2.5 | 3.2 | 3.2 | B | |
| 0.05 | 3.5 | 2.0 | 3.6 | 3.8 | A | Best results |
| 0.10 | 3.6 | 1.9 | 3.7 | 3.9 | A | |
| 0.50 | 3.7 | 1.6 | 3.7 | 3.6 | B | Slightly too salty |
| 1.00 | 3.7 | 1.5 | 3.9 | 3.5 | C | Slight bacterial sedimentation |

Test Example 3-22. Pickled Ume Plum

Commercially available ume plums pickled only with shiso (*Perilla*) and salt were broken up, and mixed well with the acetic acid bacteria-containing composition in each of the proportions shown in the table below. The resulting pickled plums were tasted and evaluated by 10 panelists. The table below shows the results.

TABLE 41

| Amount of acetic acid bacteria-containing composition added (%) w/w | Sharp saltiness | Sourness | Aroma of shiso | Overall deliciousness | Comprehensive evaluation | Notes |
|---|---|---|---|---|---|---|
| 0.00 | — | — | — | — | — | |
| 0.05 | 2.8 | 2.7 | 3.1 | 3.1 | C | |
| 0.10 | 2.0 | 1.9 | 3.3 | 3.4 | B | |
| 0.50 | 1.5 | 1.6 | 3.8 | 3.7 | A | Best results |
| 1.00 | 1.3 | 1.4 | 3.8 | 3.8 | A | |
| 5.00 | 1.2 | 1.3 | 3.9 | 3.4 | B | Slight bacterial roughness |

Test Example 3-23. Sweet-and-Sour Pork

TABLE 42

| Recipe | |
|---|---|
| Pork loin | 240 |
| Soy sauce | 6 |
| Sake | 5 |
| Batter | |
| Egg | 60 |
| Potato starch | 45 |
| Ingredients | |
| Onion | 100 |
| Carrot | 50 |
| Green bell pepper | 70 |
| Deep-frying oil | Appropriate amount |
| Sweet vinegar (amazu) | |
| Grain vinegar | 30 |
| Soy sauce | 36 |
| Sugar | 18 |
| Water | 100 |
| Potato starch | 3 |
| Sesame oil | 4 |
| | 191 |

Cut the onion into wedges and then cut in half into bite-sized pieces. Cut the carrot and the green bell peppers randomly into bite-sized pieces. Heat the carrot in a microwave (600 W) for 1 minute. Cut pork loin into bite-sized pieces and season the pork loin with soy sauce and sake beforehand. Mix ingredients for batter. Heat the deep-flying oil to 180° C. and fry the vegetables briefly. Heat the deep-flying oil to 170° C. Coat the seasoned pork loin generously with the batter and deep-fry it. Place into a frying pan the sweet vinegar containing the acetic acid bacteria-containing composition in each of the proportions shown in the table below. Simmer the sweet vinegar with constant stirring until it is thickened then add the lightly fried vegetables and fried meat and stir so that these ingredients are coated with the sweet vinegar.

The sweet-and-sour pork prepared according to the above recipe was tasted and evaluated by 10 panelists. The table below shows the results.

TABLE 43

| Amount of acetic acid bacteria-containing composition added (%) w/w | Sourness, acidic smell | Tangled taste | Overall deliciousness | Comprehensive evaluation | Notes |
|---|---|---|---|---|---|
| 0.00 | — | — | — | — | |
| 0.01 | 2.9 | 3.1 | 3.3 | C | |
| 0.05 | 2.5 | 3.3 | 3.5 | B | |
| 0.10 | 1.7 | 3.5 | 3.8 | A | Best results |
| 0.50 | 1.6 | 3.7 | 3.8 | A | |
| 1.00 | 1.4 | 3.7 | 3.8 | B | |

Test Example 3-24. Mapo Tofu

TABLE 44

| Recipe | |
|---|---|
| Tofu | 400 |
| Salad oil | 14 |
| Minced pork | 100 |
| Japanese leek (minced) | 50 |
| Garlic (minced) | 5 |
| Seasoning 1 | |
| Tianmian sauce (sweet flour paste) | 20 |
| Doubanjang (chili bean sauce) | 6 |
| Douchi (Chinese fermented black beans) | 2.9 |
| Salt and pepper | 0.5 each |
| Seasoning 2 | |
| Water | 133 |
| Sake | 15 |
| Soy sauce | 18 |
| Potato starch dissolved in water | |
| Potato starch | 9 |
| Water | 30 |
| Grain vinegar | 13 |

Cut the tofu into 2-cm cubes, boil in water for 2 minutes, and then drain in a colander. Heat the salad oil in a frying pan and fry the garlic until fragrant. Then add the minced meat and stir fry until the minced meat is broken up. Add the tofu and the acetic acid bacteria-containing composition in each of the proportions shown in the table below. Add Seasoning 2, simmer for about 2 minutes, and then add salt and pepper to adjust the taste. Add the Japanese leek and mix quickly, then add the potato starch stirring in a circles to thicken. Finally, sprinkle grain vinegar in circles over the pan and immediately turn off the heat. Mapo tofu prepared according to the above recipe was tasted and evaluated by 10 panelists. The table below shows the results.

TABLE 45

| Amount of acetic acid bacteria-containing composition added (%) w/w | Spiciness | Umami | Spice flavor | Overall deliciousness | Comprehensive evaluation | Notes |
|---|---|---|---|---|---|---|
| 0.00 | — | — | — | — | — | |
| 0.01 | 2.7 | 3.1 | 3.0 | 3.2 | C | |
| 0.05 | 2.4 | 3.2 | 3.3 | 3.5 | B | |
| 0.10 | 1.5 | 3.4 | 3.5 | 4.0 | A | Best results |
| 0.50 | 1.4 | 3.5 | 3.6 | 3.9 | A | |
| 1.00 | 1.4 | 3.6 | 3.7 | 3.6 | B | |

Test Example 3-25. Pineapple Candy

TABLE 46

| Recipe | |
|---|---|
| Water | 100 |
| Granulated sugar | 70 |
| Starch syrup | 30 |
| 100% pineapple juice (from concentrate) | 10 |

Put water, granulated sugar, and syrup in a saucepan and bring the mixture to a boil, and then raise the temperature to 120° C. Add pineapple juice and the acetic acid bacteria-containing composition in each of the proportions shown in the table below, turn off the heat, pour the mixture onto aluminum foil, and leave it to cool. After the mixture is cooled, shape it and then repeatedly stretch and overlay several times so that air inside makes the mixture glossy. Shape the dough into sticks and cut them into bite-sized pieces (about 20) with scissors. Pineapple candy prepared according to the above recipe was tasted and evaluated by 10 panelists. The table below shows the results.

TABLE 47

| Amount of acetic acid bacteria-containing composition added (%) w/w | Stickiness in sweetness | Fresh aroma of pineapple | Overall deliciousness | Comprehensive evaluation | Notes |
|---|---|---|---|---|---|
| 0.00 | — | — | — | — | |
| 0.01 | 3.0 | 3.1 | 3.2 | C | |
| 0.05 | 2.5 | 3.6 | 3.6 | B | |
| 0.10 | 2.2 | 3.9 | 4.0 | A | Best results |
| 0.50 | 2.2 | 3.8 | 4.1 | A | |
| 1.00 | 2.1 | 3.5 | 3.9 | B | Slight bacterial odor |

Test Example 3-26. Gummy

TABLE 48

| Recipe | |
|---|---|
| 100% grape juice (concentrate) | 35 |
| Gelatin powder | 5 |
| Sugar | 10 |
| | 50 |

Mix the grape juice with the sugar well, cover the resulting mixture with plastic wrap, and heat at 600 W for 1 minute. Add gelatin, mix well, and heat for another 20 seconds. Add the acetic acid bacteria-containing composition in each of the proportions shown in the table below, mix well, place the resulting mixture into a silicone mold, and solidify the mixture in a refrigerator for 3 hours. Gummy prepared according to the above recipe was tasted and evaluated by 10 panelists. The table below shows the results.

TABLE 49

| Amount of acetic acid bacteria-containing composition added (%) w/w | Stickiness in sweetness | Fresh fruit juice feeling of grapes | Overall deliciousness | Comprehensive evaluation | Notes |
|---|---|---|---|---|---|
| 0.00 | — | — | — | — | |
| 0.01 | 2.8 | 3.0 | 3.1 | C | |
| 0.05 | 2.6 | 3.4 | 3.4 | B | |
| 0.10 | 2.3 | 3.7 | 3.9 | A | Best results |
| 0.50 | 2.2 | 3.8 | 4.0 | A | |
| 1.00 | 2.2 | 3.5 | 3.7 | B | Turbid color due to the bacterial cells |

Test Example 3-27. Soft Candy (Caramel)

TABLE 50

| Recipe | |
|---|---|
| Marshmallow | 50 |
| Butter | 6.5 |
| Milk | 5 |
| | 61.5 |

Melt the butter in a frying pan on low heat. Add marshmallows and melt without letting the marshmallows burn. Keep stirring until the marshmallows become brown, while occasionally removing the pan from the heat. When the marshmallows become brown, add milk and the acetic acid bacteria-containing composition in each of the proportions shown in the table below, further mix on low heat for another 1 to 2 minutes, pour the mixture onto a parchment-lined baking tray to spread to an even thickness, and solidify the mixture by cooling in a refrigerator. Cut the cooled mixture into bite-sized pieces. Soft candy prepared according to the above recipe was tasted and evaluated by 10 panelists. The table below shows the results.

TABLE 51

| Amount of acetic acid bacteria-containing composition added (%) w/w | Stickiness in sweetness | Sweet aroma | Richness | Overall deliciousness | Comprehensive evaluation | Notes |
|---|---|---|---|---|---|---|
| 0.00 | — | — | — | — | — | |
| 0.01 | 2.5 | 3.1 | 3.0 | 3.2 | C | |
| 0.05 | 2.4 | 3.5 | 3.5 | 2.5 | B | |
| 0.10 | 2.2 | 3.9 | 3.8 | 4.0 | A | Best results |
| 0.50 | 2.2 | 4.0 | 3.9 | 4.1 | A | |
| 1.00 | 2.1 | 4.1 | 4.1 | 3.9 | B | Slightly bacterial odor |

Test Example 3-28. Ramune (Tablet Candy)

TABLE 52

| Recipe | |
|---|---|
| Glucose | 50 |
| Corn starch | 10 |
| Citric acid | 0.75 |
| Water | 1.25 |
| 100% lemon juice | 1 |
| Baking soda | 2 |
| | 65 |

Mix glucose and cornstarch well, add citric acid, water, and lemon juice, and mix well until the water is absorbed. Further, add baking soda and the acetic acid bacteria-containing composition in each of the proportions shown in the table below and mix the resulting mixture well. Place the mixture in a mold formed by combining two deep teaspoons and shape the mixture. Then, open the mold on a dish and dry the mixture well. Tablet candy prepared according to the above recipe was tasted and evaluated by 10 panelists. The table below shows the results.

TABLE 53

| Amount of acetic acid bacteria-containing composition added (%) w/w | Stickiness in sweetness | Cool sensation | Overall deliciousness | Comprehensive evaluation | Notes |
|---|---|---|---|---|---|
| 0.00 | — | — | — | — | |
| 0.01 | 3.0 | 3.0 | 3.0 | D | |
| 0.05 | 2.7 | 3.1 | 3.3 | C | |
| 0.10 | 2.5 | 3.5 | 3.5 | B | |
| 0.50 | 2.1 | 3.8 | 4.1 | A | Best results |
| 1.00 | 2.0 | 3.9 | 4.1 | A | |

Test Example 3-29. Orange Jelly

TABLE 54

| Recipe | |
|---|---|
| 100% orange juice (from concentrate) | 250 |
| Gelatin powder | 5 |
| Sugar | 3 |
| | 258 |

Place 50 g of 100% orange juice in a heat-resistant container. Add gelatin powder and mix the resulting mixture well to let the gelatin soften at room temperature for 10 minutes. Heat the above mixture in a microwave oven (600 W) for 30 seconds to completely dissolve the gelatin, and then add the remaining orange juice, sugar, and the acetic acid bacteria-containing composition in each of the proportions shown in the table below. Mix the resulting mixture well, and cool it in a refrigerator to solidify the mixture.

Jelly prepared according to the above recipe was tasted and evaluated by 10 panelists. The table below shows the results.

TABLE 55

| Amount of acetic acid bacteria-containing composition added (%) w/w | Stickiness in sweetness | Fresh fruit juice feeling | Overall deliciousness | Comprehensive evaluation | Notes |
|---|---|---|---|---|---|
| 0.00 | — | — | — | — | |
| 0.01 | 2.9 | 3.1 | 3.2 | C | |
| 0.05 | 2.6 | 3.5 | 3.5 | B | |
| 0.10 | 2.3 | 3.8 | 3.9 | A | Best results |
| 0.50 | 2.1 | 3.9 | 4.1 | A | |
| 1.00 | 2.0 | 3.9 | 3.7 | B | Slightly noticeable bacterial precipitation |

Test Example 3-30. Cereal Bar

TABLE 56

| Recipe | |
|---|---|
| Marshmallow | 120 |
| Calbee Fruit Granola | 200 |
| Carrot powder | 10 |
| Spinach powder | 10 |
| Butter | 15 |
| | 355 |

Place butter and marshmallows on low heat and melt until smooth without letting the marshmallows burn. After a mixture of fruit granola, each vegetable powder, and the acetic acid bacteria-containing composition in each of the proportions shown in the table below is prepared beforehand, add the mixture to the melted marshmallows and mix them uniformly before the resulting mixture solidifies. Pour the resulting mixture onto a parchment-lined baking tray and press down with parchment paper to spread the mixture to an even thickness. Cool and solidify the mixture in a refrigerator and cut the mixture into bite-sized pieces. Cereal bars prepared according to the above recipe were tasted and evaluated by 10 panelists. The table below shows the results.

TABLE 57

| Amount of acetic acid bacteria-containing composition added (%) w/w | Stickiness in sweetness | Harsh taste of vegetable | Grassy odor of vegetables | Overall deliciousness | Comprehensive evaluation | Notes |
|---|---|---|---|---|---|---|
| 0.00 | — | — | — | — | — | |
| 0.01 | 2.8 | 3.0 | 2.9 | 3.1 | C | |
| 0.05 | 2.5 | 2.8 | 2.7 | 3.5 | B | |
| 0.10 | 2.2 | 2.4 | 2.4 | 3.8 | A | Best results |
| 0.50 | 1.9 | 2.2 | 2.3 | 3.8 | A | |
| 1.00 | 1.8 | 2.0 | 2.1 | 3.7 | B | |

Test Example 3-31. Cookies

TABLE 58

| Recipe | |
|---|---|
| Weak flour | 120 |
| Butter | 50 |
| Sugar | 35 |
| Egg | 45 |
| | 250 |

After allowing the butter to return to room temperature, beat the butter at room temperature until it turns white. Add sugar and mix the resulting mixture well and then add the egg and mix the resulting mixture well. Sift and add the flour, add the acetic acid bacteria-containing composition in each of the proportions shown in the table below. Roughly mix the resulting mixture using a rubber spatula, wrap it in plastic wrap, and refrigerate the wrapped dough for 30 minutes. Roll out the dough to a thickness of 3 to 4 mm and cut out into a shape using a mold. Preheat the oven to 180° C. and bake the cut-out pieces of dough in the oven for about 12 minutes and then let them cool down. Cookies prepared according to the above recipe were tasted and evaluated by 10 panelists. The table below shows the results.

TABLE 59

| Amount of acetic acid bacteria-containing composition added (%) w/w | Stickiness in sweetness | Crunchy texture | Overall deliciousness | Comprehensive evaluation | Notes |
|---|---|---|---|---|---|
| 0.00 | — | — | — | — | |
| 0.01 | 3.0 | 3.2 | 3.1 | C | |
| 0.05 | 2.8 | 3.5 | 3.5 | B | |
| 0.10 | 2.4 | 3.8 | 4.0 | A | Best results |
| 0.50 | 2.1 | 4.0 | 4.0 | A | |
| 1.00 | 2.0 | 4.0 | 3.9 | A | |

Test Example 3-32. Senbei Rice Crackers

TABLE 60

| Recipe | |
|---|---|
| Rice flour | 100 |
| Potato starch | 18 |
| Water | 100 |
| | 218 |
| Sauce | |
| Soy sauce | 54 |
| Mirin | 18 |
| Sake | 15 |
| | 87 |

Add the acetic acid bacteria-containing composition to rice flour and potato starch in each of the proportions shown in the table below, and mix the resulting mixture while adding water until the mixture is as soft as an earlobe. Divide the dough into equal pieces, and roll and then flatten them by pressing each to a diameter of 4 cm. Place parchment paper on a baking tray, lay the dough pieces on the paper with space between them, and heat in a 500-W microwave oven for 2 minutes. Wipe away the water released from the dough onto the sheet, turn the dough over, and heat the other side for 1 minute. Place the dough in a toaster oven and bake until lightly browned, while turning the dough over. Senbei rice crackers prepared according to the above recipe were tasted and evaluated by 10 panelists. The table below shows the results.

TABLE 61

| Amount of acetic acid bacteria-containing composition added (%) w/w | Umami of rice | Crispy texture | Overall deliciousness | Comprehensive evaluation | Notes |
|---|---|---|---|---|---|
| 0.00 | — | — | — | — | |
| 0.01 | 3.0 | 3.3 | 3.2 | C | |
| 0.05 | 3.5 | 3.7 | 3.6 | B | |
| 0.10 | 3.7 | 4.0 | 3.9 | A | Best results |
| 0.50 | 3.8 | 4.1 | 3.9 | A | |
| 1.00 | 3.9 | 4.2 | 3.8 | A | |

Test Example 3-33. Kimchi

TABLE 62

| Recipe | |
| --- | --- |
| Chinese cabbage | 1500 |
| Salt | 60 |
| Pickling sauce | |
| Chili powder | 15 |
| Grated garlic | 60 |
| Grated ginger | 34 |
| Grated apple | 150 |
| Dried shrimp | 10 |
| Soy sauce | 36 |

Cut the Chinese cabbage into bite-sized pieces, sprinkle salt and rub the Chinese cabbage with the salt, cover the cabbage with plastic wrap, and leave it in a refrigerator for 2 hours. Combining the ingredients to prepare a pickling sauce and then add to the sauce the acetic acid bacteria-containing composition in each of the proportions shown in the table below and mix well. Rub the Chinese cabbage in the pickling sauce to allow the Chinese cabbage to absorb the sauce well and leave it in the refrigerator for 2 days. Kimchi prepared according to the above recipe was tasted and evaluated by 10 panelists. The table below shows the results.

TABLE 63

| Amount of acetic acid bacteria-containing composition added (%) w/w | Sharp sourness | Spiciness | Umami | Overall deliciousness | Comprehensive evaluation | Notes |
| --- | --- | --- | --- | --- | --- | --- |
| 0.00 | — | — | — | — | — | |
| 0.01 | 2.9 | 2.8 | 3.5 | 3.3 | C | |
| 0.05 | 2.6 | 2.4 | 3.8 | 3.5 | B | |
| 0.10 | 2.4 | 2.0 | 4.0 | 3.8 | A | Best results |
| 0.50 | 2.3 | 1.9 | 4.2 | 3.8 | A | |
| 1.00 | 2.2 | 1.8 | 4.3 | 3.9 | A | |

Test Example 3-34. Steamed Beef

Slice beef for roast beef into 5-mm-thick slices, mix the acetic acid bacteria-containing composition in each of the proportions shown in the table below with a small amount of salt, and sprinkle the mixture evenly on both sides of the beef slices. Place water in a pot and heat the pot on high heat. Put a plate in the pot from which sufficient steam is generated, and lay the slices of beef on the plate so that they do not overlap. Steam the beef slices for 4 minutes. The steamed beef prepared according to the above recipe was tasted and evaluated by 10 panelists. The results are shown in the following table.

TABLE 64

| Amount of acetic acid bacteria-containing composition added (%) w/w | Meat odor | Tenderness of meat | Overall deliciousness | Comprehensive evaluation | Notes |
| --- | --- | --- | --- | --- | --- |
| 0.00 | — | — | — | — | |
| 0.01 | 2.7 | 3.0 | 3.2 | C | |
| 0.05 | 2.4 | 3.2 | 3.5 | B | |
| 0.10 | 2.2 | 3.5 | 3.9 | A | Best results |
| 0.50 | 2.0 | 3.8 | 4.0 | A | |
| 1.00 | 1.9 | 3.8 | 3.6 | B | Slight roughness of the acetic acid bacteria to the tongue |

Test Example 3-35. Fried White Fish

The acetic acid bacteria-containing composition was added in each of the proportions shown in the table below to the cooking oil used for deep-frying 10 times, and white fish (frozen) was fried using the oil. The fried white fish prepared according to the above recipe was tasted and evaluated by 10 panelists. The table below shows the results.

TABLE 65

| Amount of acetic acid bacteria-containing composition added (%) w/w | Oxidation smell of oil | Burning smell of oil | Raw fish odor | Overall deliciousness | Comprehensive evaluation | Notes |
|---|---|---|---|---|---|---|
| 0.00 | — | — | — | — | — | |
| 0.05 | 2.4 | 2.8 | 2.9 | 3.5 | C | |
| 0.10 | 2.2 | 2.5 | 2.7 | 3.9 | B | |
| 0.50 | 2.0 | 2.2 | 2.5 | 4.0 | A | Best results |
| 1.00 | 1.9 | 2.2 | 2.5 | 4.0 | A | |
| 5.00 | 1.9 | 2.2 | 2.4 | 3.9 | B | |

Test Example 3-36. Pancake

TABLE 66

| Morinaga pancake mix | 50 |
|---|---|
| Eggs | 17 |
| Milk | 33 |
| | 100 |

Mix the eggs and milk well, and add the pancake mix. Add the acetic acid-bacteria-containing composition in each of the proportions shown in the table below, and roughly mix so that crumbly powder remains, thus making dough. Heat a frying pan on medium heat, pour the dough into the pan, reduce the heat to low when small holes appear on the pancake, then turn the pancake over and heat the other side for about 2 minutes. Pancakes prepared according to the above recipe were tasted and evaluated by 10 panelists. The table below shows the results.

TABLE 67

| Amount of acetic acid bacteria-containing composition added (%) w/w | Sweet aroma | Tenderness of dough | Overall deliciousness | Comprehensive evaluation | Notes |
|---|---|---|---|---|---|
| 0.00 | — | — | — | — | |
| 0.01 | 3.0 | 3.0 | 3.2 | C | |
| 0.05 | 3.1 | 3.2 | 3.5 | B | |
| 0.10 | 3.4 | 3.7 | 3.7 | A | Best results |
| 0.50 | 3.5 | 3.8 | 3.8 | A | |
| 1.00 | 3.5 | 3.8 | 3.8 | B | |

Test Example 3-37. Udon Noodles

TABLE 68

| Recipe | |
|---|---|
| Nissin flour for handmade udon noodles | 250 |
| Water | 90 |
| Salt | 2 |
| | 342 |

Place flour and the acetic acid bacteria-containing composition in each of the proportions shown in the table below into a noodle machine (HR2365/01; produced by Philips). Press the knead button, and then add water and knead udon noodles (using the udon noodle mode). Udon noodles prepared according to the above recipe were boiled and rinsed with water, and then tasted and evaluated by 10 panelists. The table below shows the results.

TABLE 69

| Amount of acetic acid bacteria-containing composition added (%) w/w | Firmness of noodles | Saltiness | Overall deliciousness | Comprehensive evaluation | Notes |
|---|---|---|---|---|---|
| 0.00 | — | — | — | — | |
| 0.01 | 3.0 | 3.2 | 3.1 | C | |
| 0.05 | 3.3 | 3.4 | 3.5 | B | |
| 0.10 | 3.6 | 3.7 | 3.7 | A | Best results |
| 0.50 | 3.7 | 3.8 | 3.9 | A | |
| 1.00 | 3.8 | 4.0 | 4.0 | B | |

Test Example 3-38. Paste of Pumpkin

TABLE 70

| Recipe | |
|---|---|
| Pumpkin | 200 |
| Olive oil | 24 |
| Salt and pepper | A little |
| | 224 |

Cut the pumpkin into large pieces, boil until soft, and mix in a blender. Mix olive oil, salt, and pepper with the acetic acid bacteria-containing composition in each of the proportions shown in the table below and mix well until smooth. The paste made according to the above recipe was spread on bread, and tasted and evaluated by 10 panelists. The table below shows the results.

TABLE 71

| Amount of acetic acid bacteria-containing composition added (%) w/w | Grassy odor of pumpkin | Sweetness of pumpkin | Overall deliciousness | Comprehensive evaluation | Notes |
|---|---|---|---|---|---|
| 0.00 | — | — | — | — | |
| 0.01 | 2.8 | 3.0 | 3.2 | C | |
| 0.05 | 2.4 | 3.4 | 3.4 | B | |
| 0.10 | 2.2 | 3.7 | 3.8 | A | Best results |
| 0.50 | 2.0 | 3.8 | 4.0 | A | |
| 1.00 | 1.8 | 3.9 | 3.9 | B | |

Test Example 3-39. Yogurt Vinegar Drink

TABLE 72

| Recipe | |
| --- | --- |
| Apple cider vinegar | 15 |
| Plain yogurt | 45 |
| Sucralose | 0.03 |
| Yogurt flavoring | 0.25 |
| Water | 150 |
| | 210.28 |

A yoghurt vinegar drink was prepared according to the recipe. The acetic acid bacteria-containing composition was added in each of the proportions shown in the table below, and stirred well. The resulting yoghurt vinegar drink was tasted and evaluated by 10 panelists. The table below shows the results.

TABLE 73

| Amount of acetic acid bacteria-containing composition added (%) w/w | Astringent taste in yogurt | Stuffy smell of apple cider vinegar | Vinegar stimulation to the throat | Harmonized aroma (sense of unity) | Overall deliciousness | Comprehensive evaluation | Comments |
| --- | --- | --- | --- | --- | --- | --- | --- |
| 0.00 | — | — | — | — | — | — | |
| 0.01 | 2.7 | 2.6 | 2.7 | 3.3 | 3.7 | B | |
| 0.05 | 2.4 | 2.4 | 2.4 | 3.9 | 4.0 | A | |
| 0.10 | 2.2 | 2.2 | 2.1 | 4.1 | 4.0 | A | |
| 0.50 | 2.0 | 2.1 | 1.9 | 4.2 | 3.9 | B | |
| 1.00 | 1.9 | 1.9 | 1.7 | 4.3 | 3.6 | C | Concern about bacterial sedimentation and rough feeling to the palate |

Test Example 3-40. Berry Vinegar Drink

TABLE 74

| Recipe | |
| --- | --- |
| Pure brown rice black vinegar | 10 |
| 100% blueberry juice | 20 |
| 100% grape juice | 20 |
| Glucose fructose syrup | 5 |
| Citric acid | 0.2 |
| Sugar | 5 |
| Water | 140 |
| | 200.2 |

A berry vinegar drink was prepared according to the recipe. The acetic acid bacteria-containing composition was added in each of the proportions shown in the table below and stirred well. The resulting berry vinegar drink was tasted and evaluated by 10 panelists. The table below shows the results.

TABLE 75

| Amount of acetic acid bacteria-containing composition added (%) w/w | Stuffy smell of black vinegar | Vinegar stimulation to the throat | Fresh aroma of fruit juice | Color fading after 1-month storage at 40° C. | Overall deliciousness | Comprehensive evaluation | Comments |
| --- | --- | --- | --- | --- | --- | --- | --- |
| 0.00 | — | — | — | — | — | — | |
| 0.01 | 2.6 | 2.6 | 3.3 | 2.8 | 3.5 | B | |
| 0.05 | 2.3 | 2.0 | 3.8 | 2.1 | 4.0 | A | |

TABLE 75-continued

| Amount of acetic acid bacteria-containing composition added (%) w/w | Stuffy smell of black vinegar | Vinegar stimulation to the throat | Fresh aroma of fruit juice | Color fading after 1-month storage at 40° C. | Overall deliciousness | Comprehensive evaluation | Comments |
|---|---|---|---|---|---|---|---|
| 0.10 | 2.2 | 1.9 | 4.0 | 2.0 | 4.2 | A | |
| 0.50 | 2.0 | 1.7 | 4.1 | 1.9 | 3.9 | B | |
| 1.00 | 1.8 | 1.6 | 4.1 | 2.0 | 3.7 | C | Concern about bacterial sedimentation and rough feeling to the palate |

Test Example 3-41. Carbonated Beverage

TABLE 76

| Recipe | |
|---|---|
| 100% lemon juice | 15 |
| Fructose glucose syrup | 15 |
| Vitamin C powder | 0.5 |
| Carbonated water | 150 |
| | 180.5 |

A carbonated beverage was prepared according to the recipe. The acetic acid bacteria-containing composition was added in each of the proportions shown in the table below and stirred well, and tasted and evaluated by 10 panelists. The table below shows the results.

TABLE 77

| Amount of acetic acid bacteria-containing composition added (%) w/w | Fresh aroma of lemon | Vitamin smell | Refreshing feeling of carbonic acid | Overall deliciousness | Comprehensive evaluation | Comments |
|---|---|---|---|---|---|---|
| 0.00 | — | — | — | — | — | |
| 0.01 | 3.3 | 2.7 | 3.5 | 3.3 | B | |
| 0.05 | 3.7 | 2.2 | 4.0 | 4.3 | A | Best results |
| 0.10 | 3.9 | 2.0 | 4.2 | 4.4 | A | |
| 0.50 | 4.2 | 2.0 | 4.3 | 3.9 | B | |
| 1.00 | 4.3 | 1.9 | 4.3 | 3.5 | C | Concern about bacterial sedimentation and rough feeling to the palate |

Test Example 3-42. Smoothie

TABLE 78

| Apple with peel | 140 |
|---|---|
| Bananas | 50 |
| Yuzu juice | 15 |
| | 205 |

Deseeded non-peeled apples with the cores removed and peeled bananas were mixed in a blender. Yuzu juice was added to prepare a smoothie. The acetic acid bacteria-containing composition was added in each of the proportions shown in the table below and stirred well. The resulting smoothie was tasted and evaluated by 10 panelists. The table below shows the results.

TABLE 79

| Amount of acetic acid bacteria-containing composition added (%) w/w | Fresh aroma of apples | Grassy odor of bananas | Refreshing aroma of yuzu | Overall deliciousness | Comprehensive evaluation | Comments |
|---|---|---|---|---|---|---|
| 0.00 | — | — | — | — | — | |
| 0.01 | 3.3 | 2.5 | 3.5 | 3.6 | B | |
| 0.05 | 3.8 | 2.0 | 4.2 | 4.2 | A | Best results |
| 0.10 | 4.0 | 1.9 | 4.3 | 4.4 | A | |
| 0.50 | 4.1 | 1.8 | 4.3 | 4.0 | B | |
| 1.00 | 4.3 | 1.6 | 4.4 | 3.6 | C | Concern about bacterial sedimentation and rough feeling to the palate |

Test Example 3-43. Beverage Containing Apple Juice

TABLE 80

| Recipe | |
|---|---|
| Apple with peel | 17 |
| Apple juice | 1 |
| Apple cider vinegar | 1.5 |
| Water | 30 |
| | 49.5 |

Remove the seeds and cores from the apples and place the apples in a blender. Prepare a beverage according to the above recipe, add the acetic acid bacteria-containing composition in each of the proportions shown in the table below, and stir the resulting mixture well. The resulting beverage was tasted and evaluated by 10 panelists. The table below shows the results.

TABLE 81

| Amount of acetic acid bacteria-containing composition added (%) w/w | Fresh aroma of apples | Vinegar stimulation to the throat | Refreshing sweetness of apples | Overall deliciousness | Comprehensive evaluation | Comments |
|---|---|---|---|---|---|---|
| 0.00 | — | — | — | — | — | |
| 0.01 | 3.4 | 2.7 | 3.5 | 3.3 | B | |
| 0.05 | 3.8 | 2.5 | 3.8 | 3.9 | A | |
| 0.10 | 4.0 | 2.2 | 3.9 | 4.3 | A | Best results |
| 0.50 | 4.1 | 2.1 | 4.0 | 4.3 | A | |
| 1.00 | 4.2 | 2.0 | 4.1 | 4.1 | B | |
| 2.00 | 4.3 | 1.9 | 4.2 | 3.6 | C | Concern about bacterial sedimentation and rough feeling to the palate |

Test Example 3-44. Beauty Drink

TABLE 82

| Recipe | |
| --- | --- |
| Peach juice | 1 |
| Grape juice | 1 |
| Collagen peptide | 5 |
| Hyaluronic acid | 5 |
| Erythritol | 2 |
| Acesulfame K | 0.005 |
| Sucralose | 0.005 |
| Citric acid | 0.5 |
| Vitamin C | 0.1 |
| Water | 36 |
| | 50.61 |

A drink was prepared according to the above recipe. The acetic acid bacteria-containing composition was added in each of the proportions shown in the table below, stirred well, and tasted and evaluated by 10 panelists. The table below shows the results.

TABLE 83

| Amount of acetic acid bacteria-containing composition added (%) w/w | Collagen odor | Lingering sweetness aftertaste | Fruit juice feeling | Overall deliciousness | Comprehensive evaluation | Comments |
| --- | --- | --- | --- | --- | --- | --- |
| 0.00 | — | — | — | — | — | |
| 0.01 | 2.6 | 2.6 | 3.3 | 3.4 | B | |
| 0.05 | 2.3 | 2.3 | 3.6 | 3.8 | A | |
| 0.10 | 2.1 | 2.2 | 3.8 | 4.0 | A | Best results |
| 0.50 | 1.9 | 2.1 | 3.9 | 4.0 | A | |
| 1.00 | 1.8 | 2.0 | 4.0 | 3.9 | B | |
| 2.00 | 1.8 | 1.9 | 4.0 | 3.6 | C | Concern about bacterial sedimentation and rough feeling to the palate |

The invention claimed is:

1. A method for producing an acetic acid bacteria-containing composition,
    the method comprising (i) culturing an acetic acid bacteria, (ii) collecting the acetic acid bacteria after step (i), and (iii) drying the acetic acid bacteria after step (ii), wherein:
    the acetic acid bacteria is *Acetobacter malorum*;
    step (i) further comprises mixing the acetic acid bacteria with nonanal and methylheptenone so that the peak area ratio of nonanal to methylheptenone (nonanal:methylheptenone), as determined by solid-phase microextraction gas chromatography-mass spectrometry, is 1:10 to 100:1; and
    in step (i), the acetic acid bacteria comprises acetic acid bacteria, dimethyl trisulfide, and 2-tridecanone so that the peak area ratio of nonanal to methylheptenone (nonanal:methylheptenone) is 1:10 to 100:1, the peak area ratio of nonanal to dimethyl trisulfide (nonanal: dimethyl trisulfide) is 1:100 to 50:1, and the peak area ratio of nonanal to 2-tridecanone (nonanal:2-tridecanone) is 1:100 to 100:1.

2. The method for producing the acetic acid bacteria-containing composition according to claim 1, further comprising culturing the acetic acid bacteria in a medium containing vinegar in step (i).

3. The method for producing the acetic acid bacteria-containing composition according to claim 1, further comprising subjecting the acetic acid bacteria obtained after step (iii) to a high-temperature treatment under low pH conditions.

4. The method for producing the acetic acid bacteria-containing composition according to claim 2, further comprising subjecting the acetic acid bacteria obtained after step (iii) to a high-temperature treatment under low pH conditions.

5. The method for producing the acetic acid bacteria-containing composition according to claim 1, further comprising adding water to the acetic acid bacteria obtained after step (ii) for washing.

6. The method for producing the acetic acid bacteria-containing composition according to claim 4, further comprising adding water to the acetic acid bacteria obtained after step (ii) for washing.

7. The method for producing the acetic acid bacteria-containing composition according claim 1, wherein the peak area ratio of nonanal to methylheptenone (nonanal:methylheptenone) is 1:1 to 50:1.

8. The method for producing the acetic acid bacteria-containing composition according to claim 7, wherein the peak area ratio of nonanal to methylheptenone (nonanal:methylheptenone) is 1:1 to 20:1.

9. The method for producing the acetic acid bacteria-containing composition according to claim 8, wherein the peak area ratio of nonanal to methylheptenone (nonanal:methylheptenone) is 2:1 to 10:1.

10. The method for producing the acetic acid bacteria-containing composition according to claim 1, wherein the peak area ratio of nonanal to dimethyl trisulfide (nonanal:dimethyl trisulfide) is 1:100 to 15:1.

11. The method for producing the acetic acid bacteria-containing composition according to claim 10, wherein the peak area ratio of nonanal to dimethyl trisulfide (nonanal:dimethyl trisulfide) is 1:100 to 10:1.

12. The method for producing the acetic acid bacteria-containing composition according to claim 11, wherein the peak area ratio of nonanal to dimethyl trisulfide (nonanal:dimethyl trisulfide) is 1:30 to 10:1.

13. The method for producing the acetic acid bacteria-containing composition according to claim 1, wherein the peak area ratio of nonanal to 2-tridecanone (nonanal:2-tridecanone) is 1:50 to 50:1.

14. The method for producing the acetic acid bacteria-containing composition according to claim 13, wherein the peak area ratio of nonanal to 2-tridecanone (nonanal:2-tridecanone) is 1:10 to 50:1.

15. The method for producing the acetic acid bacteria-containing composition according to claim 14, wherein the peak area ratio of nonanal to 2-tridecanone (nonanal:2-tridecanone) is 1:6 to 25:1.

* * * * *